US007580643B2

United States Patent
Moore et al.

(10) Patent No.: US 7,580,643 B2
(45) Date of Patent: Aug. 25, 2009

(54) COMMUNICATIONS SYSTEMS AND METHODS

(75) Inventors: Mark Justin Moore, Cambridge (GB); Jack Arnold Lang, Cambridge (GB)

(73) Assignee: Staccato Delaware, Inc., Mountain View, CA (US)

( * ) Notice: Subject to any disclaimer, the term of this patent is extended or adjusted under 35 U.S.C. 154(b) by 698 days.

(21) Appl. No.: 11/192,415

(22) Filed: Jul. 29, 2005

(65) Prior Publication Data
US 2007/0025739 A1 Feb. 1, 2007

(30) Foreign Application Priority Data
Jul. 28, 2005 (GB) ................................ 0515522.1

(51) Int. Cl.
*H04B 10/06* (2006.01)
(52) U.S. Cl. .......................... 398/202; 398/78; 398/189
(58) Field of Classification Search .................. 398/77, 398/78, 189, 190, 191, 202
See application file for complete search history.

(56) References Cited

U.S. PATENT DOCUMENTS

| 4,563,774 | A | * | 1/1986 | Gloge ......................... 398/166 |
| 5,194,865 | A | * | 3/1993 | Mason et al. ................ 341/132 |
| 5,327,277 | A | * | 7/1994 | Van Der Plas et al. ....... 398/161 |
| 5,598,287 | A | * | 1/1997 | Van Driel et al. ............. 398/76 |
| 5,684,871 | A | | 11/1997 | Devon et al. |
| 6,137,609 | A | | 10/2000 | Scheps |
| 6,160,802 | A | | 12/2000 | Barrett |
| 6,275,544 | B1 | * | 8/2001 | Aiello et al. ................. 375/326 |
| 6,414,774 | B1 | | 7/2002 | Scifres |
| 6,462,860 | B1 | | 10/2002 | Ionov |
| 2002/0145484 | A1 | | 10/2002 | Agoston et al. |
| 2002/0167373 | A1 | | 11/2002 | Agoston et al. |
| 2003/0235236 | A1 | | 12/2003 | Santhoff |
| 2004/0166817 | A1 | | 8/2004 | Mokhtari et al. |
| 2004/0170439 | A1 | | 9/2004 | Hiironen |
| 2004/0218687 | A1 | | 11/2004 | Santhoff |
| 2004/0264701 | A1 | | 12/2004 | Lee et al. |
| 2005/0019040 | A1 | * | 1/2005 | Trutna, Jr. ................... 398/183 |
| 2005/0135811 | A1 | | 6/2005 | Lee et al. |

FOREIGN PATENT DOCUMENTS

EP 1220480 A1 7/2002

(Continued)

OTHER PUBLICATIONS

Search Report for GB Patent Appl. No. GB0515522.1, 1 page, dated Nov. 22, 2005.

(Continued)

*Primary Examiner*—Christina Y Leung
(74) *Attorney, Agent, or Firm*—Van Pelt, Yi & James LLP

(57) ABSTRACT

This invention relates to systems and methods for wireless and wired optical data communications, in particular infrared data communications using techniques borrowed ultra wideband (UWB) radio.

An optical data communications receiver for receiving data encoded using optical pulse position, the receiver comprising: an optical signal reception device; a reference signal memory for storing a reference channel response signal; and a correlator coupled to said reference signal memory and to said optical signal reception device for correlating a received optical pulse with said stored reference channel response signal to determine said optical pulse position; an output coupled to said correlator to provide pulse position data for said received optical pulse.

18 Claims, 14 Drawing Sheets

FOREIGN PATENT DOCUMENTS

| | | |
|---|---|---|
| EP | 1 480 349 A2 | 11/2004 |
| GB | 2219164 A | 11/1989 |
| GB | 2376858 A | 12/2002 |
| GB | 2 402 302 A | 12/2004 |
| GB | 2404124 A | 1/2005 |
| JP | 63-99621 A | 4/1988 |
| JP | 2000-013317 A | 1/2000 |
| JP | 2000-267771 A | 9/2000 |
| WO | WO 03/069799 A2 | 8/2003 |

OTHER PUBLICATIONS

Search Report for GB Patent Appl. No. GB0518108.6, 1 page, dated Nov. 25, 2005.

Tanaka, Y. and Nakagawa, M., "Optical Multi-Wavelength PPM for high data rate transmission on indoor channels," *Proceedings of the 1997 International Symposium on Personal, Indoor and Mobile Radio Communications*, vol. 3/3, pp. 979-983 (Sep. 1-4, 1997).

Iversen, K. et al., "$D^2$-ary Signaling for Incoherent All-Optical CDMA Systems," *Proceedings of the 1997 IEEE International Symposium on Information Theory*, p. 484 (Jun. 29-Jul. 4, 1997).

Lee, C.K. et al., "Generation and Performance Analysis of Frequency-Hopping Optical Orthogonal Codes with Arbitrary Time Blank Patterns," *ICC2001—The IEEE International Conference on Communications*, vol. 4 of 10, pp. 1275-1279 (Jun. 11-14, 2001).

Search Report, dated Mar. 30, 2006, for UK Patent Application No. GB0515522.1, 2 pages.

English abstract corresponding to Japanese Publication No. JP 63-99621 A, 1 page.

English abstract corresponding to Japanese Publication No. JP 2000-013317 A, 1 page.

Welcome to IrDA [online], [Retrieved on Nov. 8, 2005]. Retrieved from the Internet: <URL: http://www.irda.org/>.

Jiménez, R.P., Wireless infrared and UWB impulse radio systems [online], Jul. 6, 2005, [Retrieved on Nov. 8, 2005]. Retrieved from the Internet: <URL: http://newyork.ing.uniroma1.it/neuwb2/DOCS/invited-03.pdf>.

Poulton, K. et al., "A 20GS/s 8b ADC with a 1MB Memory in 0.18 μm CMOS," *IEEE International Solid-State Circuits Conference: Digest of Technical Papers*, Session 18—NYQUIST A/D Converters, Paper 18.1, 10 pages (Feb. 2003).

Shiu, D. and Khan, J.M., "Differential Pulse-Position Modulation for Power-Efficient Optical Communication," *IEEE Transactions on Communications*, vol. 47, No. 8, pp. 1201-1210 (Aug. 1999).

Yang, C.-K. et al., "A Serial-Link Transceiver Based on 8-GSamples/s A/D and D/A Converters in 0.25- μm CMOS," *IEEE Journal of Solid-State Circuits*, vol. 36, No. 11, pp. 1684-1692 (Nov. 2001).

\* cited by examiner

COMMUNICATIONS SYSTEMS AND METHODS

BACKGROUND OF THE INVENTION

1. Field of the Invention

This invention relates to systems and methods for wireless and wired optical data communications, in particular infrared data communications using techniques borrowed ultra wideband (UWB) radio.

2. Background Art

Standards for infrared data communication are defined by the Infrared Data Association (IrDA: www.irda.org) and cover data communication rates to around 4 Mbps. The standards are generally directed to point-to-point connectivity at distances of up to 1 m. Using transceivers that broadcast infrared pulses in a cone of up to 30 degrees half angle off centre. The specifications also require that a maximum irradiance is not exceeded so as not to swamp and "blind" a receiver, for similar reasons the transmissions are half-duplex. The IrDA protocol stack bundles data for transmission into a data packets with start and stop bits, and, optionally, a CRC value. Over this runs a Link Access Protocol (LAP) for device discovery and establishing a "virtual wire" connection, a Link Management Protocol (LMP) which allows one or more services to be registered and operate over a connection; other, higher level protocols may also be implemented. There is interest in operating IrDA links at higher data rates but there are problems with the IrDA protocols when the data rates are increased significantly. There are also general problems with infrared (and optical) data communications including interference, for example from fluorescent lights, and multipath dispersion, which can cause inter symbol interference (ISI). Some background prior art relating to optical and infrared communications can be found in D Shiu and J M Kahn; "Differential Pulse-position Modulation for Power-efficient Optical Communication", *IEEE Trans. Comm.* 47:1201-1210 (1999), and in U.S. Pat. No. 6,414,774.

The inventors have recognised that techniques borrowed from ultra wide band (UWB) radio communications may advantageously be employed to provide improved optical communications systems. Ultra wide band communications systems typically employ very short pulses of electromagnetic radiation resulting in a spectrum with a very wide bandwidth; when an antenna is substantially directly excited with such a pulse the system may be referred to as carrierless or carrier free since the resulting rf emission lacks any well defined carrier frequency. Other UWB techniques employ multiband OFDM (orthogonal frequency division multiplexed) technology. The techniques used in UWB receivers, combined with the very short pulses employed, make radio frequency UWB receivers relatively robust with respect to multipath effects. The inventors have recognised that similar techniques may be employed in the optical field in order to mitigate optical ISI. Furthermore some particular techniques employed by the inventors in their UWB receiver systems may also be used to implement new types of optical communication system.

BRIEF SUMMARY OF THE INVENTION

According to a first aspect of the present invention there is therefore provided an optical data communications receiver for receiving data encoded using optical pulse position, the receiver comprising: an optical signal reception device; a reference signal memory for storing a reference channel response signal; and a correlator coupled to said reference signal memory and to said optical signal reception device for correlating a received optical pulse with said stored reference channel response signal to determine said optical pulse position; and an output coupled to said correlator to provide pulse position data for said received optical pulse.

Broadly speaking, embodiments of the above receiver facilitate substantial reduction in the effect of multipath reflections, either in free space or in a "wired" connection such as a passive optical network (PON) such as a network connecting a head end device to multiple (for example greater than 100, 500 or 1000) households. Embodiments of the above described receiver are also useful in mitigating the effects of pulse smearing which arise in multimode optical fibres. Depending upon the receiving system in which the receiver is used the pulse position data may comprise hard decision data or soft data, for example for a Viterbi or similar channel decoding system.

In some preferred embodiments the receiver includes a reference signal acquisition system to determine a reference channel response signal from a received signal. This may, for example, detect a known training pattern in the header of a data packet and may optionally de-convolve this prior to storage. However in embodiments a digitised waveshape of a received reference signal is stored in the reference signal memory for correlation with the received signal, optionally oversampling around the expected location of a pulse.

Known infrared data communications systems are generally point-to-point but, in embodiments, the reference signal memory stores a plurality of reference signals each corresponding to a different IR (infrared) transmitter, optionally a transmitter (transceiver) identifier being stored together with the reference signal. In this way a reference for a particular transmitter may be selected according to from which transmitter signals are being received and/or reference signals may be selected on a time-multiplexed basis.

In order to extract more energy from the received signal and to better mitigate the effects of multipath preferably the reference channel response signal comprises a plurality of multipath components. The environment in which the receiver is to operate may be known in advance, for example office, home, optical fibre network, or a user register may be provided for selecting an operating environment. In some environments multipath reflections may persist for a long period of time relative to the pulse duration (which may be less than 10 ns or less than 1 ns) and therefore, in embodiments, the reference signal memory has a data structure which allows a channel response signal to be defined as a plurality of multipath components each separated by a delay—for example pulse shapes for the separate multipath components separated by data indicating time intervals between the multipath components. A receiver controller may be provided to determine the reference signal data from the digitised received signal and to write this into the reference signal memory.

It will be appreciated that in some environments the multipath components of one pulse might arrive after a direct path component of the next pulse—for example pulses may be transmitted at time intervals in the range 1 ns to 10 ns or 100 ns whereas multipath components of a transmitted pulse may continue to be received at a detectable level for longer time intervals. Preferably, therefore, the correlator includes storage for a partial correlation result in order to be able to re-use the correlator and thus correlate interleaved multipath components (which here includes the direct path component) by switching the correlator to accumulate partial correlation values for one pulse or the next depending upon the transmitted pulse to which a received pulse component belongs. Preferably such a receiver also includes a pattern generator to control the reference signal memory to provide such interleaved multipath components (of a stored reference signal) for correlation with interleaved multipath components of successively transmitted IR pulses.

To facilitate rapid detection of what might be weak or very weak pulses preferably the correlator is configured to effectively implement multiple correlators in parallel over a transmission frame. In practice, as described further below, the expected pulse position is known, at least within a range, and thus the total effective number of correlators may be reduced.

Preferably, therefore, the correlator is configured to correlate, within a time window, a plurality of samples of the received optical pulse with a plurality of samples of the stored reference channel response signal. Thus, preferably, the reference channel response signal is stored in multiported memory to provide a plurality of successively delayed versions of the reference signal, preferably overlapping in time. Preferably a plurality of such correlators is implemented, coupled to the reference signal memory and to the signal reception device at a plurality of successive respective relative delays (between the received optical signal and the reference), to determine the position (in time) of an optical pulse.

In some particularly preferred embodiments a whitening function is employed to apply a pseudorandom pulse position modulation to a transmitted pulse, the receiver thus further comprising a pseudorandom sequence generator arranged so that it can be synchronised to the transmitter. Preferably the "whitening" modulation is greater than the (information) data modulation to facilitate decoding. The decoding process may efficiently be performed by locating one or more correlators at the expected position of a pulse as determined from the pseudorandom sequence, the precise position of the pulse determining the modulated (information) data.

Thus in a related aspect the invention provides an optical data communications receiver for receiving data encoded using optical pulse position, the receiver comprising:

an optical signal reception device; a correlator coupled to said optical signal reception device for determining a received optical pulse position; an output coupled to said correlator to provide pulse position data for said received optical pulse; and wherein said optical pulse position is modulated by a pseudorandom sequence, the receiver further comprising a pseudorandom sequence generator for tracking said pseudorandom modulation.

Thus in a further related aspect the invention provides an optical data communications transmitter for transmitting data encoded using optical pulse position, the transmitter including a pseudorandom sequence generator for imposing a pseudorandom spreading code on said pulse positions encoding said data for transmitting.

In a still further related aspect the invention a method of optical data communications, the method comprising: inputting data to be transmitted; pulse position modulating said data onto an optical signal; sending said optical signal to an optical receiver; receiving said optical signal at said receiver; and demodulating said received optical data; and the method further comprising spreading said modulated pulse positions according to a pseudorandom sequence to reduce susceptibility of the communicated data to systematic noise.

The invention also provides an optical data communications system, the system comprising: an output for data to be transmitted; a pulse position modulator for pulse position modulating said data onto an optical signal; an optical transmitter to transmit said optical signal; an optical receiver to receive said transmitted optical signal; and a demodulator for demodulating said received optical data to recover said transmitted data; and wherein the system further comprises a spreader for spreading said modulated pulse positions according to a pseudorandom sequence to reduce susceptibility of the communicated data to systematic noise.

Whitening the transmitted data provides a number of advantages, importantly a reduction in the sensitivity of the receiver to internal or external systematic noise such as might arise from digital circuitry and/or fluorescent lighting.

Preferably the receiver pseudorandom sequence generator is coupled to one or both of the reference signal memory and correlator for correlating the received optical pulse with the stored reference channel response signal at positions in time determined by the pseudorandom sequence. In embodiments the correlator (which may include multiple instances of correlation hardware and/or time-multiplexed hardware) correlates in two or more of these positions in parallel, preferably at least in positions corresponding to the two possible values of an encoded bit (here bit referring to a "raw" bit of data sent over the channel, and overall system typically including some form of channel encoding/decoding over this). For example, at, say, the 57th frame a bit may be expected at the 13th or at the 39th discrete time interval within the frame).

Synchronisation data for a pseudorandom sequence such as a sequence identifier and/or sequence seed may be provided to the receiver in an unwhitened packet header. It will be recognised that, in embodiments, one or both of the sequence identifier and sequence seed may be fixed or predetermined.

The above described techniques facilitate implementation of virtually a complete receiver system in a single integrated circuit, the integrated circuit including both a front end analogue-to-digital converter and subsequent digital received signal processing circuitry.

Thus in another aspect the invention provides an optical data communications receiver comprising: a receiver front end including an optical signal reception device coupled to an analogue-to-digital (A/D) converter to digitise an optical signal received by said optical signal reception device; and a correlator coupled to said A/D converter to correlate said digitised received optical signal with a reference to decode said received optical signal.

In order to operate a UWB-type receiver system with an optical signal reception device the front end is preferably configured to implement a peak detect function for the reception device. Thus whereas in a radio system the front end A/D is preferably centred on a mid-point of an input received waveform (for example by keeping statistics on maximum and minimum values and adjusting a DC offset to a zero/mid-position). In an optical system the A/D is run with an offset from zero so that the front end of the receiver in effect provides a peak-detect. More generally, the A/D converter has a non-linear conversion function so that the digital output value is a non-linear function of the analogue input. A multibit A/D converter may be employed but in some preferred embodiments a single bit A/D converter is used. In such a case the zero/one threshold may be displaced from a mid or zero-crossing position to implement the peak detect. Optionally the one (or more) bit sample may be squared to provide an energy detect function input to the UWB receiver processing. Optionally the receiver front end may also include a received signal level adjuster to adjust an input signal (level) to the analogue-to-digital converter, in particular in response to the reference channel response signal and/or statistics gathered on the received signal.

In a further related aspect, therefore, the invention provides an optical data communications receiver, the receiver comprising: an optical signal reception device having an output; and a UWB receiver system coupled to said output of said optical signal reception device.

Transmitters, receivers and corresponding methods as described above may advantageously be employed in free space optical communications such as in-room infrared broadcast communications and in passive optical networks, for example point-to-multipoint (PONs).

The inventors have further recognised that the above described techniques facilitate the implementation of ad-hoc multihop fixed or peer-to-peer mesh networks, in particular because they provide an ability to support multiple optical channels. For example the above described pseudorandom whitening code may be employed to define code division multiplexed channels in an optical communications system. Alternatively in an optical communications system based upon a multiband-type UWB receiver one or more optical channels may be defined using one or more OFDM bands.

Thus in a further aspect of the invention there is provided an optical mesh network, the network comprising a plurality of optical transceivers, each said transceiver comprising an optical data communications transmitter configured to modulate data to be transmitted onto an optical output of the transceiver and an optical data communications receiver configured to receive an optical signal and to demodulate said received signal to recover transmitted data, and wherein transmitter is configured to spread said transmitted data using a pseudorandom sequence, and wherein said receiver in configured to despread said received optical signal to recover said transmitted data.

In embodiments of the network when one transceiver is out of range of another communication takes place via one or more intermediary transceivers. Thus preferably a transceiver includes a controller for automatically establishing a link with another transceiver. Preferably, therefore, a routing table is stored linking incoming data on one channel with outgoing data on a second channel so that each transceiver need only be locally aware of a next transceiver (or destination) to which data should be sent. Preferably this routing table stores an identifier that uniquely identifies a path through the network to a destination for a data packet. When a transceiver initially connects to the network a unique identifier such as a device name and/or address may be broadcast to other transceivers (nodes) within range for configuration of a local routing table, and forwarded by these nodes to other nodes within the network to make the network (transceivers) generally aware of the new connection. Dormant connections in the routing table may be effectively deleted after a dormant time interval has elapsed. A channel may be used for bi-directional, for example half-duplex communication or separate channels may be used for forward and reverse connections between pairs of nodes.

Free space optical data transmissions is not necessarily limited to line-of-sight communications, particularly when embodiments of the above described technique are employed to provide sensitive detection of noisy optical pulses and/or pulses in the presence of background noise. However, in some environments such as home environments with optically opaque partition walls, it is desirable to be able to provide an alternative communications technique which is similarly capable of operating at very high data rates.

Thus in a further aspect of the invention there is provided a dual-capability transceiver system for networking, the transceiver having dual optical/UWB data communication capability, the transceiver including: an interface for optical emitter/detector; an interface for rf emitter/detector; and a UWB signal processor coupled to said rf emitter/detector interface for sending and receiving radio frequency (rf) UWB transmissions and having UWB signal processing hardware for processing received UWB transmissions to retrieve communicated data; and wherein said optical emitter/detector interface shares at least a portion of said UWB signal processing hardware for processing received optical transmissions to retrieve optically communicated data.

By providing both high speed optical and high speed UWB communications links embodiments of the device may have greater flexibility. In embodiments sharing the UWB signal processing hardware enables high speed data communications over both optical and UWB links, for example in excess of 100 Mbps, 500 Mbps or 1 Gbps. The optical emitter/detector may comprise, for example, a laser diode and a pin or avalanche diode detector; the rf emitter/detector may comprise a simple rf antenna or a near-field coupling device as described, for example, in the applicant's GB0428046.7 of 22 Dec. 2004, and related applications. In embodiments, depending upon the optical emitter/detector employed and upon any optional interfaced circuitry used, a common interface may be provided for optical and rf communications. The possibility of using an infrared channel to provide a secure method for sending a security key to a UWB receiver is described in US 2004/0264701, but because of the inherent drawback associated with conventional methods of IR communication as described in this document ("infrared communication . . . can, in a practical sense, accommodate a relatively small amount of information") the possibility of using infrared radiation for communication of data for a consumer electronic device (CED) such audio and/or still or moving image data was not contemplated.

In a further aspect the invention provides a network of consumer electronic devices at least some of these including a dual-capability transceiver as described above.

In all of the above described receivers, transmitters, methods and network the optical signal is not restricted to visible wavelengths and, in particular, preferred embodiments employ infrared (IR) signals, typically at wavelengths longer than 700 nm, for free space transmissions avoiding water absorption regions and for fibre transmissions generally (but not necessarily) in a fibre telecommunications band such as O, E, S, C, L or U-band (approximately 1200 nm to 1700 nm).

In embodiments of the above described receivers, transmitters, networks, methods and transceivers the communicated optical data preferably comprises data at a rate of more than 100 Mbps, preferably more than 500 Mbps or 1 Gbps.

The above described features and aspects of the invention may advantageously be combined and permuted, as will be understood by the skilled person.

These and other aspects of the present invention will now be further described, by way of example only, with reference to the accompanying FIGs. in which:

BRIEF DESCRIPTION OF THE FIGURES

FIGS. 13a and 13b show, respectively, a reference waveform generation system, and a variant of the system of FIG. 13a;

DETAILED DESCRIPTION OF THE INVENTION

Figure 1:
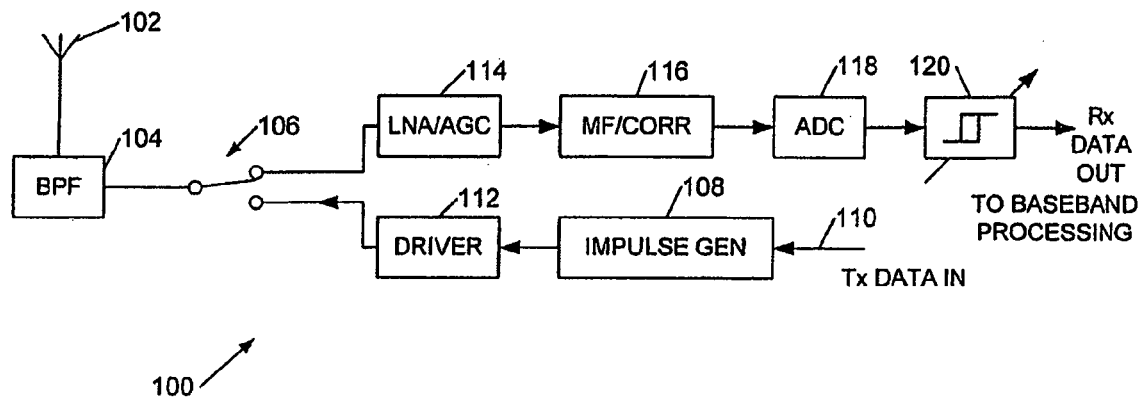
FIG. 1 show a typical UWB transceiver.

FIG. 1 shows an example of an analogue UWB transceiver 100. This comprises an transmit/receive antenna 102 with a characteristic impulse response indicated by bandpass filter (BPF) 104 (although in some instances a bandpass filter may be explicitly included), couples to a transmit/receive switch 106.

The transmit chain comprises an impulse generator 108 modulatable by a baseband transmit data input 110, and an antenna driver 112. The driver may be omitted since only a small output voltage swing is generally required. One of a number of modulation techniques may be employed, typically either OOK (on-off keying i.e. transmitting or not transmitting a pulse), M-ary amplitude shift keying (pulse amplitude modulation), or PPM (pulse position modulation i.e. dithering the pulse position). Typically the transmitted pulse has a duration of <1 ns and may have a bandwidth of the order of gigahertz.

The receive chain typically comprises a low noise amplifier (LNA) and automatic gain control (AGC) stage 114 followed by a correlator or matched filter (MF) 116, matched to the received pulse shape so that it outputs an impulse when presented with rf energy having the correct (matching) pulse shape. The output of MF 116 is generally digitised by an analogue-to-digital converter (ADC) 118 and then presented to a (digital or software-based) variable gain threshold circuit 120, the output of which comprises the received data. The skilled person will understand that forward error correction (FEC) such as block error coding and other channel coding/decoding and baseband processing may also be employed, but such techniques are well-known and conventional and hence these is omitted for clarity.

Figure 2:
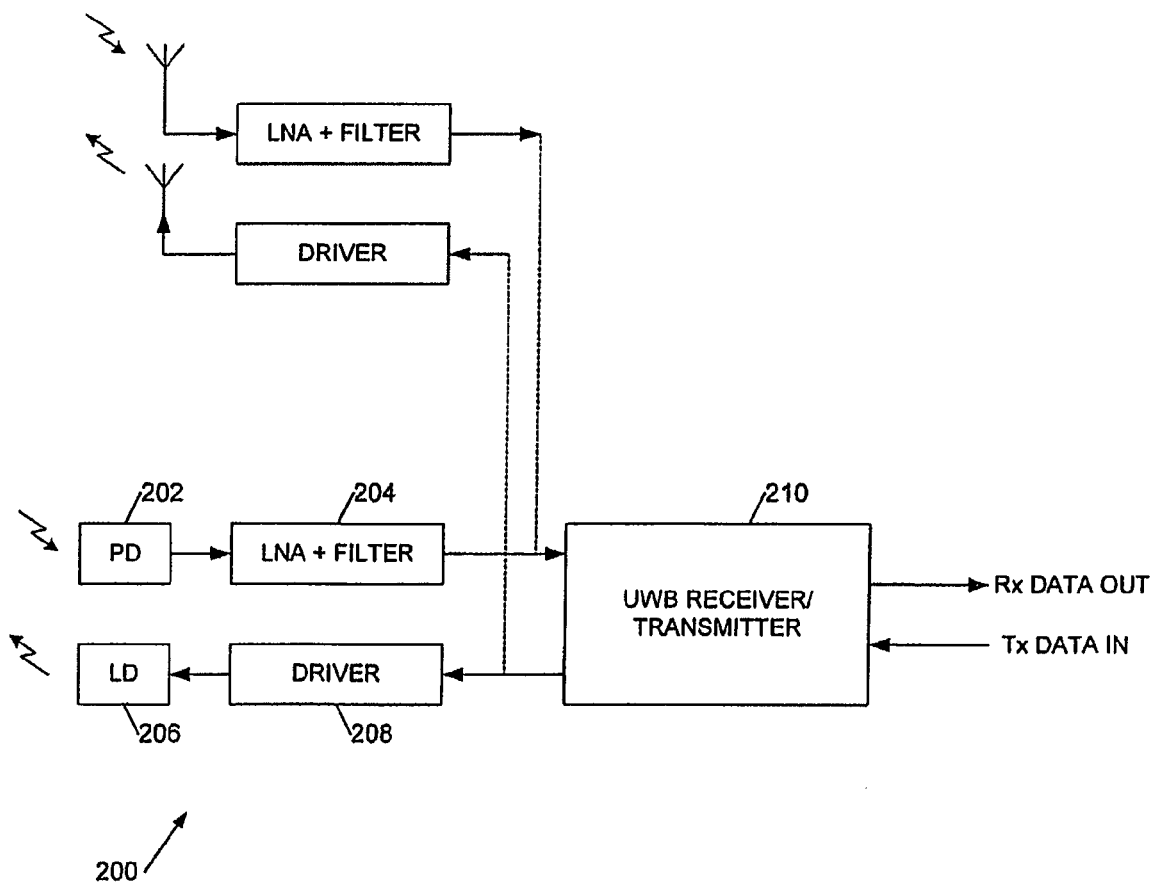
FIG. 2 shows a block diagram of an infrared data communications transceiver according to an embodiment of an aspect of the present invention.

Referring next to FIG. 2, this shows an embodiment of an optical transceiver 200, based on a UWB receiver system 210, in particular the system described later but optionally some other UWB system, such as that shown in FIG. 1.

In optical transceiver 200, UWB receiver/transmitter 210 the receive antenna is replaced by a fast photodiode 202 such as a PIN photodiode, together with a suitable front end LNA (low noise amplifier, for example a transimpedance amplifier) and filter 204 to couple the photodiode to the receiver/transmitter block 210. In a similar way the transmit antenna is replaced by an optical emitter such as a light emitting or laser diode 206, again coupled to the receiver/transmitter block 210 by a suitable driver 208. Typically an optical output power in the range 1-10 mW may be employed at a near-IR wavelength such as 785 nm, 808 nm, 875 nm or 976 nm; fast laser diodes sub-nm rise/fall times are readily available. The photodiode is selected so as to be responsive at the transmitter wavelength. The system we describe can provide sensitive detection and thus no additional optics are necessary. A receiver without additional optics will generally exhibit a wide acceptance angle, which is often advantageous. Alternatively simple light collection/directional optics such as a lens and diffuser may be employed. An optical filter such as a low (IR)-pass, bandpass or interference filter may be employed for increased sensitivity. In embodiments the receiver/transmitter block 210 comprises a single chip UWB receiver/transmitter of the type described in more detail below. Optionally, as illustrated, a common UWB chip may be interfaced or interfaceable to both optical and UWB radio communications, for example by selectable links or by a switch, optionally under automatic control.

In other embodiments the optical receiver and/or transmitter may be configured for coupling to a fibre optic, for example as part of a passive optical network. Such coupling arrangements are well known to those skilled in the art, and substantially any conventional coupling arrangement may be employed.

Figure 3A:
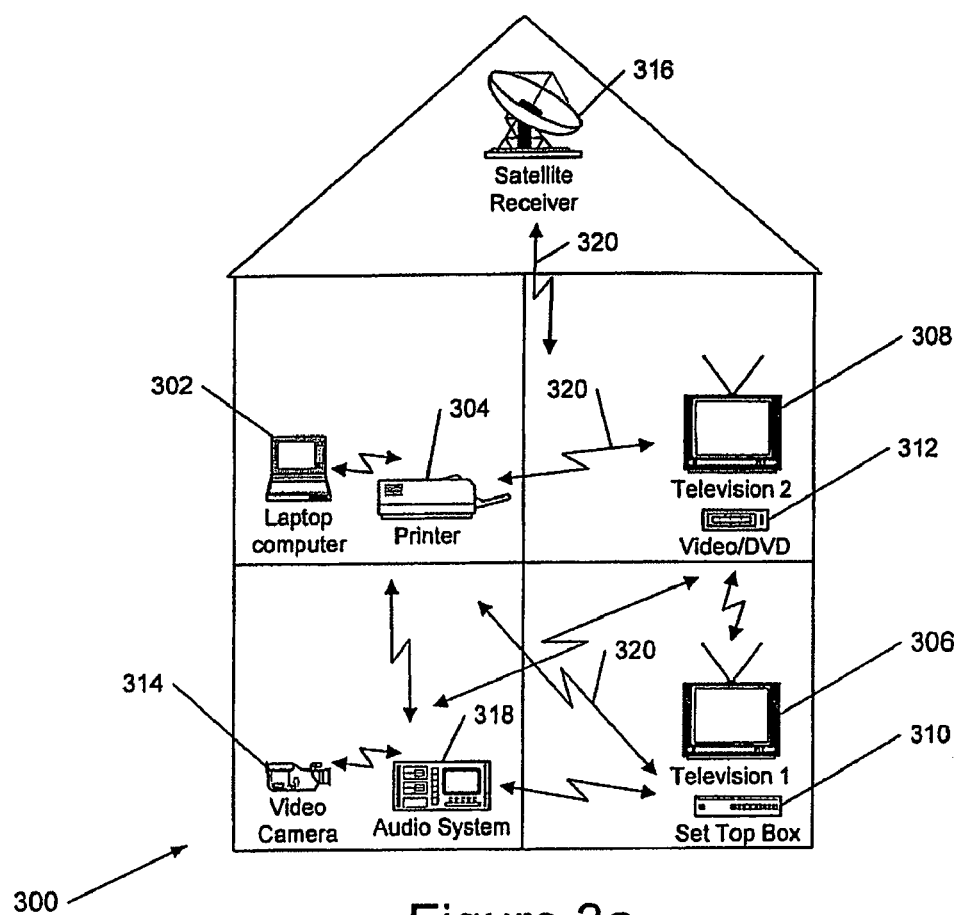
FIGS. 3a to 3e show, respectively, an example of a combined optical/UWB home wireless mesh network, a schematic diagram of an optical network with a mesh topology, a first example of a processing node on a optical mesh network, a second example of a processing node on a optical mesh network, and an architecture for a node of an optical/UWB network.

FIG. 3a, this shows an example of a wireless home network 300 comprising a plurality of consumer electronic devices each of which is provided with an optical and/or UWB transceiver and an associated controller to enable it to act as a node on the network. In the illustrated example nodes on the network include a laptop computer 302 and printer 304, first and second televisions 306, 308, a set top box 310 and a video/DVD player 312, a video camera 314, a satellite receiver 316, and an audio system 318. As schematically illustrated by communication paths 320 these devices are in optical/radio communication with one another although in general not every device will be in communication with every other device. For example the satellite receiver 316 may be located in the loft of a building and may therefore only be able to communicate by radio UWB with UWB-enabled devices in upstairs rooms whereas the laptop 302 and printer 304 may communicate using an optical UWB connection.

Figure 3B:
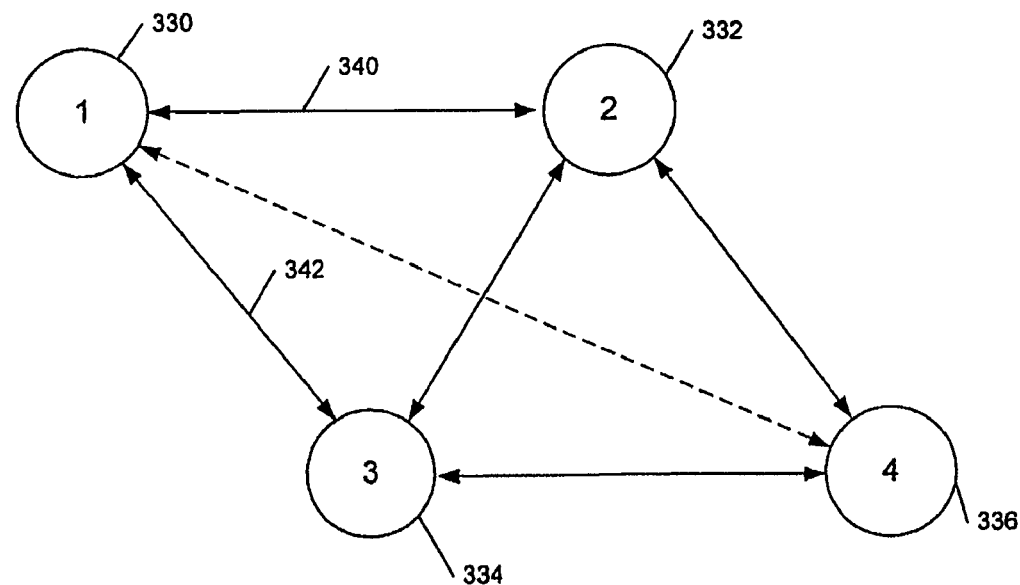

FIG. 3b shows a simplified schematic diagram of an optical/UWB home wireless network such as that shown in FIG. 3a. In the example of FIG. 3b the network has four nodes 330, 332, 334, 336 defining a mesh topology. Each node is in communication with each other node as illustrated by the solid lines connecting the nodes, except for nodes 330 and 336 which are out of range of one another, as indicated by the dashed line connecting these nodes. In this context it is noted that there may not be a sharply defined range limit for communication between two nodes, in which case 'range' may be taken to mean range providing an acceptable data rate and/or error rate. Thus in FIG. 3b if nodes 330 and 336 wish to communicate with one another the communication must be routed via either node 332 or node 334. From FIG. 3a it will be appreciated that the topology of the network is variable since network enabled devices may be physically moved between locations and/or switched on and off. Moreover at times devices may be added to or removed from the network. It is preferable that such network modifications do not require reconfiguration of the network by a user, and in particular that there is no need for configuration of one or more routers as would be the case in a traditional IP (internet protocol) network. It can further be seen that in the networks of FIGS. 3a and 3b there is no single network backbone across which traffic could be managed.

Figure 3C:
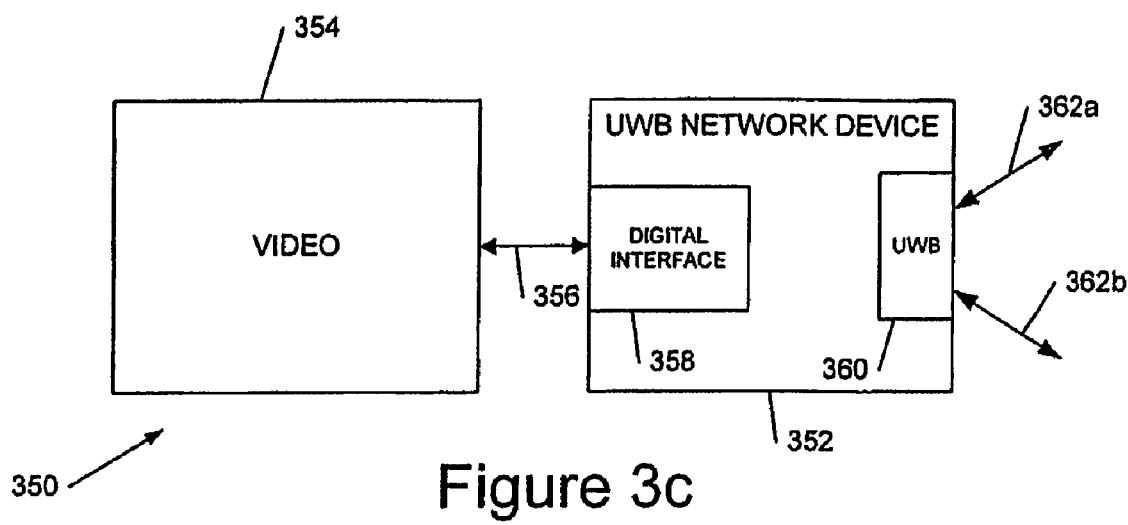
Figure 3D:
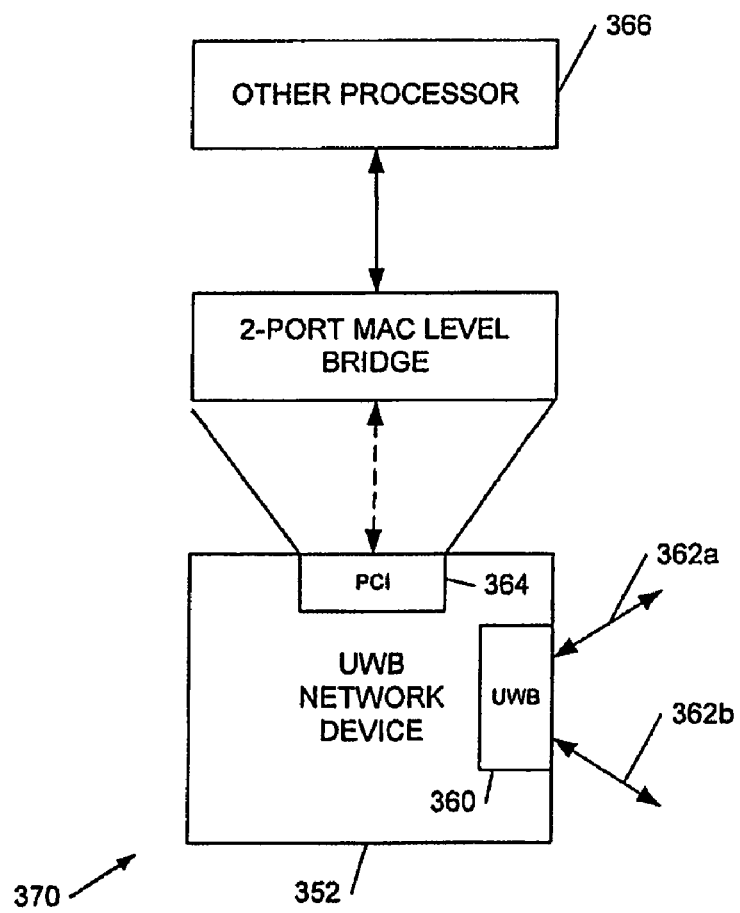

FIGS. 3c and 3d show two examples of nodes on the network of FIG. 3b. FIG. 3c shows a node 350 comprising a network device 352 coupled to a video recorder/player 354 by means of a digital link 356 comprising, for example, a coaxial cable or PCI (peripheral component interconnect) connection. The network device 352 comprises a digital interface 358 for digital link 356 and a UWB transceiver 360 to provide one or more communication channels 362 such as an optical channel 362a and/or a radio UWB channel 362b. FIG. 3d shows another example of a node 370 in which like elements to those of FIG. 3c are indicated by like reference numerals. In the example of FIG. 4b UWB network device 352 includes a PCI interface 364 to another processor 366 such as a processor of a DVD player or an Ethernet router. In the example of FIG. 3d network device 352 implements a two port MAC (media access control) level bridge to the other processor 366 in a conventional manner.

Referring again to FIG. 3b, communication between pairs of nodes of the network, in this embodiment, takes place on different channels. Thus, for example, link 340 between nodes 330 and 332 may utilise a first optical/UWB channel and link 342 between nodes 330 and 334 may utilise a second optical/UWB channel. As previously mentioned this may be implemented using code division multiplexing, different ultra-wide frequency bands or in some other way. There may be different kinds of channel operating, optical and/or radio UWB channels and, for each, one or more code channels which may be used to distinguish between different concurrent networks or piconets using CDMA techniques. The logical communication flow channels within the network may be built over these and thus there may be several concurrent logical channels on any given single CDMA domain, either due to a distinction on grounds of QoS (bandwidth or latency control) or simply because there are multiple devices sharing the same CMDA domain by means of time multiplexing. Data packets transmitted over the network preferably contain some form of logical routing information, which may be either derived from paired MAC addresses in an 802.3 style Ethernet frame or by means of a proprietary header word.

Communication between two devices may use concurrent transmission using different coding, and optionally wavelength bands and/or a combination of radio and optical communications. Alternatively time multiplexing may be employed, to either multiplex the physical layer (PHY) between different codes and/or wavelengths and/or optical/radio, or to time multiplex different devices sharing a common physical channel. Thus to communicate on two or more channels a single transmitter, receiver or transceiver may be time multiplexed or a "separate" transmitter/receiver/transceiver may be provided for each channel. For example a logical transceiver may be provided for each parallel channel up to a maximum number of channels, each of these logical transceivers being accessed by a different logical port. Some particularly advantageous communication protocols are described in the Applicant's co-pending UK patent application no. 0312197.7, although conventional mesh network communication protocols may be also employed.

Figure 3E:
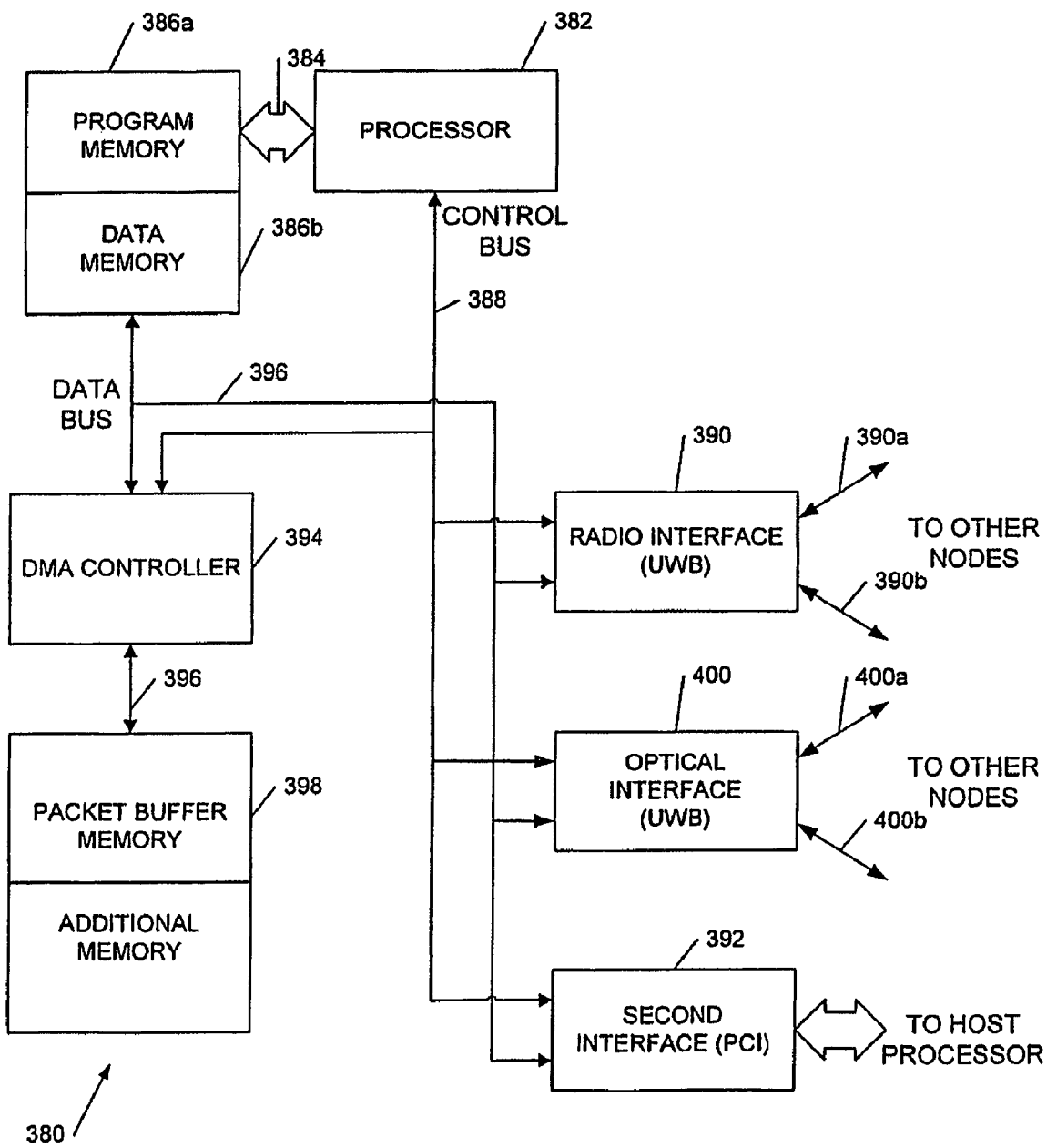

FIG. 3e shows an architecture 380 of a network device for the above described network. The device comprises a processor 382 which has an address and data bus 384 connecting the processor to programme memory 386a and data memory 386b. The processor also has a control bus 388 for reading and writing control data from and to peripheral devices which here comprise one or both of a UWB radio interface 390 and an optical (UWB-based) interface 400, a second interface 392 to a host processor or device, and a DMA (direct memory access) controller 394. The UWB radio interface 390 and optical interface 400 provide multi channel bi-directional communications as schematically indicated by links 390a, b and 400a, b; preferably these incorporate forward error correction. The second interface 392 may comprise a PCI interface or an Ethernet interface or another optical/UWB interface, and enables the network device to be coupled to a host processor such as a TV, video, computer, set top box and the like. Apart from the data bus included with buses 384 the network device includes a second data bus 396 which is used for transporting data sent over the network. Thus data bus 396 is coupled to radio/optical interfaces 390/400 and to second interface 392 as well as to buffer memory 398 for buffering transmitted packet data. However data bus 396 is not directly connected to the data bus of processor 382 and instead is controlled by DMA controller 394, which in preferred embodiments is the only bus master on this data bus to avoid the need for bus arbitration. Thus DMA controller 394 controls the transfer of data between radio/optical interfaces 390/400, packet buffer memory 398 and second interface 392. Such data transfer is indirectly controlled by processor 392 via control bus 388; preferably processor 382 is the only bus master on this control bus, again so that no bus arbitration is required. Preferably data bus 396 is further coupled to the data memory 386b of processor 382 in order to allow data to be exchanged between packet buffer memory 398 and data memory 386b under control of DMA controller 394. This allows, for example, packet header data to be transferred to data memory 386 for processing by processor 382. In a preferred embodiment DMA controller 394 also has a plurality of registers accessible to the processor using control bus 388, these registers storing packet control information such as channel handle information as described further below. Optionally additional memory such as Flash memory or SDRAM may be appended to the packet buffer memory 398, and likewise accessed by DMA controller 394.

A transmission medium coupling a UWB transmitter and UWB receiver, which may comprise a wireless or wired communications channel, will typically give rise to dispersion (which distorts the received pulse shape) and other physical effects that complicate the function of the receiver. These other effects include multiple path reflections, which result in multiple pulses at the receiver for each transmitted pulse, in some cases rf pulses being phase inverted. Also, interference and noise sources are received in addition to the desired pulse data. Noise sources include thermal noise (from the receiver itself), narrow band interference from transmitters sharing the same frequency spectrum, and broadband interference, from internal logic switching and external sources. There may be further interference from co-located systems. The inventors have recognised that some of these problems, in particular multipath and interference, are common to both UWB and pulsed IR communications links.

Figure 4A:
FIGS. 4a to 4d show, respectively, a transmitted UWB signal comprising a single pulse, an example of a received version of the transmitted pulse of FIG. 4a with multipath reflections and other propagation effects, a series of transmitted UWB pulses of the type shown in FIG. 4a, and a received signal corresponding to the transmitted signal of FIG. 4c showing overlapping multipath reflections.
Figure 4B:
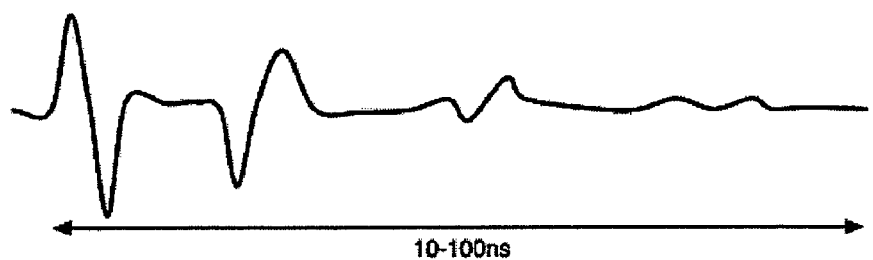

By way of illustration, FIG. 4a shows a transmitted UWB pulse, which in this example has a duration of approximately 100 ps. FIG. 4b shows the same pulse as it might be seen by a UWB receiver. As can be seen the received pulse has a plurality of multipath components and also exhibits distortion and other propagation effects. Multipath components are received over a time scale which depends upon the transmission channel but which may, for example, be between 10 ns and 100 ns (the pulses shown in this diagram are not to scale), multipath at the longer end of this range being observed in wired systems such as UWB over mains (AC power cable) transmissions as described in the co-depending UK Patent Application No. 0222828.6 filed on 2nd Oct. 2002. The first received multipath component need not be the largest (as shown in FIG. 4b) and may be significantly distorted or even inverted.

Figure 4C:
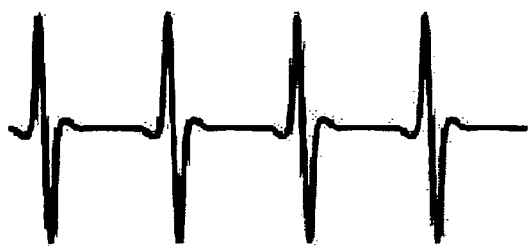
Figure 4D:

FIG. 4c illustrates a series of transmitted pulses and FIG. 4d an example of a corresponding received signal. It can be seen that multipath reflections from one pulse may overlap with the first signals from the next pulse. This problem is exacerbated when timing modulation is applied to a transmitted pulse.

Figure 5:
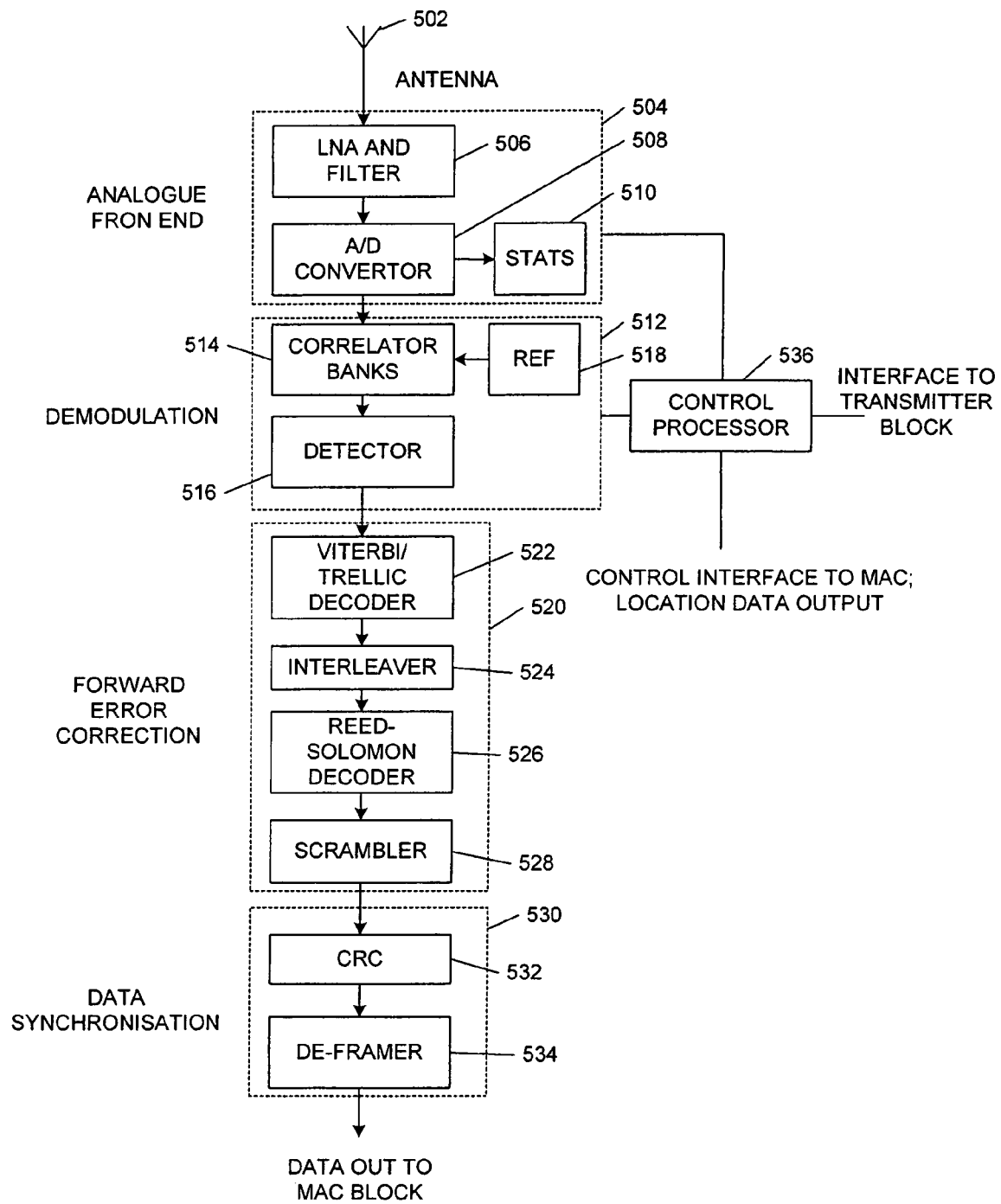
FIG. 5 shows an overview block diagram of a UWB receiver.

FIG. 5 shows a block diagram of a UWB receiver 500 suitable for receiving such signals. We later describe how such a receiver may be adapted for optical use.

An incoming UWB signal is received by an antenna 502, which may comprise a capacitive an/or inductive coupling to a cable system such as a mains power cable or a telephone cable. The received UWB signal is provided to an analog front end block 504 which comprises a low noise amplifier (LNA) and filter 506 and an analog-to-digital converter 508. A set of counters or registers 510 is also provided to capture and record statistics relating to the received UWB input signal. The analog front end 504 is primarily responsible for converting the received UWB signal into digital form.

The digitised UWB signal output from front end 504 is provided to a demodulation block 512 comprising a correlator bank 514 and a detector 516. The digitised input signal is correlated with a reference signal from a reference signal memory 518 which discriminates against noise and the output of the correlator is then fed to the defector which determines the n (where n is a positive integer) most probable locations and phase values for a received pulse.

The output of the demodulation block 512 is provided to a conventional forward error correction (FEC) block 520. In one implementation of the receiver FEC block 520 comprises a trellis or Viterbi state decoder 522 followed by a (de) interlever 524, a Reed Solomon decoder 526 and (de) scrambler 528. In other implementations other codings/decoding schemes such as turbo coding may be employed.

The output of FEC block is then passed to a data synchronisation unit 530 comprising a cyclic redundancy check (CRC) block 532 and de-framer 534. The data synchronisation unit 530 locks onto and tracks framing within the received data separating MAC (Media Access Control) control information from the application data stream(s) providing a data output to a subsequent MAC block (not shown).

A control processor 536 comprising a CPU (Central Processing Unit) with program code and data storage memory is used to control the receiver. The primary task of the control processor 536 is to maintain the reference signal that is fed to the correlator to track changes in the received signal due to environmental changes (such as the initial determination of the reference wave form, control over gain in the LNA block 506, and on-going adjustments in the reference wave form to compensate for external changes in the environment).

Referring now to the analog front end 504 in more detail, in a preferred arrangement the LNA block 506 amplifies the signal received from the antenna or cable coupling. The amplifier design contains a fixed frequency passive filter that rejects signals out side of the FCC/ETSC permitted spectral band (3.1-10.6 GHz), as well as rejecting signals from the 5 GHz UNII frequency band. Rejection of such signal areas prevents strong narrow band transmissions from saturating the subsequent A/D converter. It is particularly important to reject signals that are likely to be co-located with a UWB device, such as 802.11, Bluetooth and mobile phone frequencies.

The LNA also contains a switchable attenuator that may be used to adjust the signal level fed to the A/D unit. The attenuator may be controlled directly by both the control processor 536 and the reference signal. The purpose of the attenuator is to avoid input saturation at the A/D unit, while maintaining sufficient sensitivity to detect the received pulse waveform.

The reference waveform from the Detector unit may also control the attenuation in real time, allowing different gain settings to be applied to different portions of the multipath signals that are received from a single pulse. The A/D converter 508 may take a variety of forms. In a preferred embodiment the A/D converter 508 is logically configured as a continuous sampler, effectively providing a continuous stream of samples at a suitable rate as determined by the upper frequency of the relevant UWB band and the Nyqust criterion, for example 20 G samples per seconds (20 GHz) for a 10 GHz upper frequency. Physically, however, the A/D module may comprise a bank of samplers, for example 16 to provide 16 samples for each received pulse, successively triggered by a phase tapped clock to provide a snapshot of a portion of a received UWB signal at different phases which may then be used to provide an input to the correlator banks 514 of demodulation block 512. In this way parallel blocks of signal samples may be provided at a rate of a few hundred megahertz, for example at substantially the pulse repetition frequency (PRF) rate thus effectively reducing the primary digitisation clock speed to this rate; preferably each block substantially spans the duration of a received UWB pulse. Implementing the sampler as a plurality of parallel sampling circuits operating of a phase tapped reference clock facilitates the fabrication of suitable sample (and hold) devices on conventional silicon processors.

Some examples of fast A/D converters are the described in the following documents, which are hereby incorporated by referenced: "A 20 GSamples/s 8-Bit A/D Convertor with a 1 MB memory in 0.18□CMOS presented by Brian Setterberg of Agilent Technologies, Inc., at the 2003 IEEE International Solid-State Circuit Conference (ISSCC)"; "A Serial-Link Transceiver Based on 8-Gsamples/s A/D and D/A Converters in 0.25□m CMOS presented by Chih-Kong Ken Yang, Vladimir Stojanovic, Siamak Modjtahedi, Mark A, Horowitz and William F. Ellersick, IEEE Journal of Solid-State Circuits, Vol 36, No 11, November 2001"; published US Patent Applications 2002 0167373 and 2002 0145484.

Depending upon the application the A/D converter may either be a single-bit converter or a multi-bit converter, and may either monitor the received voltage level or the power level in the received signal. The A/D converter 508 may comprise a non-continuous sampler where the sampler is run only around the expected time of arrival of a received pulse (or around a desired time slice when hunting for a received pulse) and is substantially inactive at other times. In this way a high sampling rate may effectively be achieved but with advantages such as reduced power consumption.

In general, it is desirable to gain as much information about the input signal as possible, favouring a multi-bit voltage sensitive sampling scheme. However, implementation constraints (physical silicon area and power consumption) mean that such a scheme is preferably only used for devices where immunity to noise (including unexpected narrow band interference) is important, for example where operation in close proximity to an 802.11 system is envisaged. In some arrangements sure bit conversion permits an acceptable compromise.

Non-continuous sampling can offset some of the disadvantages of such a sampler, but can constrain the range of possible delay modulation values that can be detected, thereby reducing the potential information that can be carried by each pulse. Such a trade-off is often acceptable in systems where there are many co-located independent pulse transmissions, since the risk of 'collisions' between pulses from different transmissions is reduced.

Single bit sampling is prone to saturation but offers a significant saving in silicon cost and power consumption and is therefore preferable level based A/D converters benefit from accurate control the input signal gain. The AFE 504 therefore preferably contains counters that monitor statistics of the input signal conversion, recording the number of values recorded in each of the sampling levels over some period of time. Software running on the Control Processor periodically reads these values and resets the counters. The software may then use these to determine an optimum setting for the gain/attenuation control applied to the received signal by LNA unit 506. For such purposes, the software may assume that the received signal is, on average, a gaussian noise signal.

In an optical system such as that shown in FIG. 2, LNA/filter 506 may be replaced by optical transceiver components, but substantially the same A/D converter and subsequent signal processing circuitry may be employed as for rf UWB. However whereas in a radio UWB system the A/D operates in a zero-crossing mode, with a 1-bit converter allocating a binary one to positive signal values and a binary zero to negative signal values or vice-versa, in an optical receiver system the A/D is run at an offset from zero, defining a "slicing level" to provide a peak detect function. Preferably the sample "slicing" threshold is adjustable, and in embodiments this may be automatically adjusted in response to the received signal level and/or to recorded statistics relating to the received signal level and/or to a level of the stored reference signal for the received signal. In some preferred embodiments a 1-bit A/D is used, the 1-bit sample performing an energy detect function, although in other embodiments a multibit A/D may be employed.

Referring now to the demodulator block 512, this is responsible for extracting a data signal imposed on the pulses by a transmitter.

The scheme described here is specifically designed to decode modulation by means of the pulse arrival time or by the pulse phase. It may also be adapted to detect modulation by means of the pulse shape (spectral modulation).

The input to the demodulator is a stream of sample data from the AFE 504; the output is a stream of decoded data bits. The output data rate is substantially constant fixed by the PRF (Pulse Repetition Frequency) and the number of bits encoded by each pulse. The operating parameters of the demodulator (PRF and bit-encoding) are typically fixed for a given transmitter. However, the demodulator (and other system parameters, such as AFE gain) may be time multiplexed by the MAC processor in order to facilitate near simultaneous reception from multiple transmitters.

The demodulator contains units to correlate the received signal against a reference signal (programmed and maintained to track changes in the external signal propagation environment) by control processor 536. The detailed form of the demodulator is shown in FIG. 6.

Figure 6:
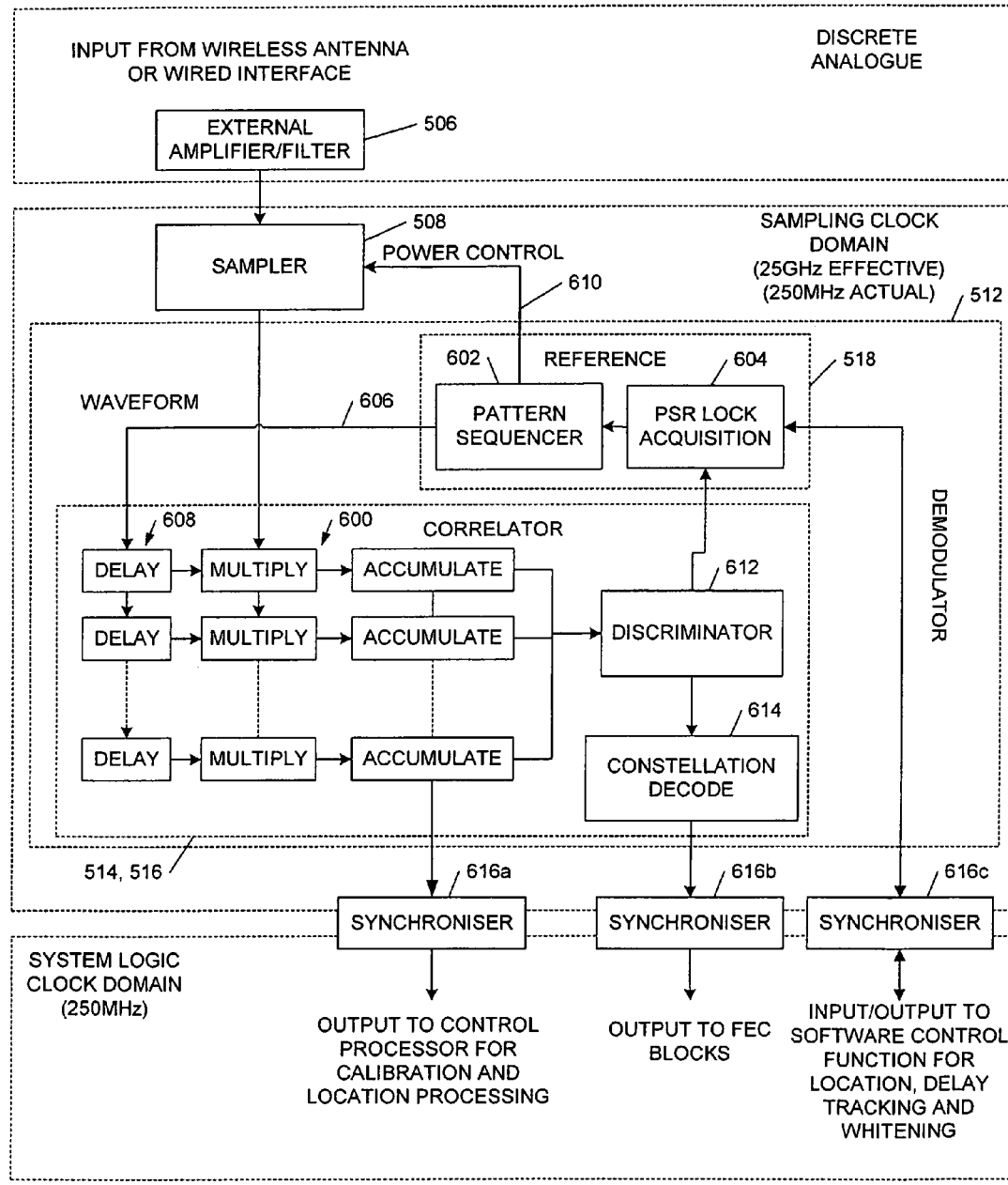
FIG. 6 shows a simplified block diagram of a demodulator architecture for use with the receiver of FIG. 5.

Referring to FIG. 6, this shows a simplified block diagram of demodulator 512 of FIG. 5; like elements to those of FIG. 5 are indicated by like reference numerals. The input from the wireless antenna or wired interface and amplifier/filter unit 506 is implemented in discrete analog circuitry, and the A/D (sampler) 508 and demodulator 512 are implemented in the sampling clock domain which has, in one embodiment, an effective range of 25 GHz, corresponding to an actual clock rate of 250 MHz. The system control logic and output to the forward error correction apparatus also operates at 250 MHz.

The correlator 514 comprises a bank of multiply-accumulate units 600 each of which receives an input signal sample (comprising a set of samples of the input signal at successive sampling intervals) and multiplies this by a reference sample (comprising a set of samples of a reference waveform at successive sampling intervals) provided by reference waveform synthesiser 518. In the case of single bit A/D sampling the multiplier operation may be implemented using a simple XOR gate. The accumulators average the (correlation) data over a number of pulses, by averaging over (successive) transmitted pulses bearing the same encoded data and/or averaging over multipath components.

The reference signal generator or synthesiser 518 provides the reference signal to the multiply-accumulate units 600 under control of a pattern sequencer 602. The pattern sequencer is controlled by a PSR (Pseudo Random) sequence lock acquisition module 604, preferably implemented in software as described later. Conceptually the pattern sequencer 602 provides a reference waveform 606 to a plurality of delay units 608 to provide a plurality of successively delayed versions of the reference waveform to multiply-accumulate units 600. However although illustrated as a pipeline system with multiply-accumulated delay taps equivalent to a sample period to reduce the effective clock speed the reference waveform is preferably applied in parallel to the multiply-accumulate units 600 as described later. Such a parallel implementation is possible because the reference waveform is stored in memory and therefore a parallel set of differently delayed reference waveforms may be read out from the memory substantially simultaneously; implementation of the demodulator would be significantly more complex were delay taps conceptually applied to the incoming received UWB signal sample data since without additional complexity this would not be readily available in the form of successively delayed time windows of samples of parallel in samples.

The reference signal for the correlator is programmed into the reference signal generator 518 by software running on control processor 536, which preferably uses a training algorithm to determine the receiver response (that is, amplitude and phase distortion to a transmitted pulse). The control processor 536 also maintains a clock phase locked to the PRF (Pulse Repetition Frequency) of the transmitter from which signals are being received by using the arrival times of detected pulses relative to an internal timing reference (Local Crystal Oscillator). A power control output 610 from the reference waveform generator may also be employed to gate power to the A/D and sampling circuitry 508 to put this circuitry into a reduced power mode in periods where there is no expected received signal. This is particularly advantageous in systems using a multi-bit A/D since these often have a relatively large power consumption.

A multiply-accumulate unit 600 provide outputs to a discriminator 612 which determines the sign and peak value (or values if probabilistic outputs are supplied to the following stage of the (absolute) value maximum accumulator output). The discriminator outputs provide an output data signal identifying the position of a received pulse and the pulse phase (that is, normal or inverted). A constellation decoder maps this position/phase data from the discriminator to an n-bit symbol which is then passed to the forward error correction block 520.

The demodulator 512 has a plurality of interfaces to other parts of the receiver system, each of which is preferably via a data synchroniser 616*a, b, c*, such as a register or buffer. Thus the multiply-accumulate units 600 provide an output to the control processor 536 for calibration of the receiver front end (and preferably also the transmission channel) and for location processing to facilitate physical location of a UWB receiver according to known techniques. The interface between the constellation decoder 614 and FEC blocks 520 is preferably also implemented via a buffer. The PSR lock acquisition module 502 preferably has a bi-directional interface to a software control function implemented on control processor 536 to provide functions such as physical location of the receiver, delay tracking, and data (de) whitening.

Figure 7:
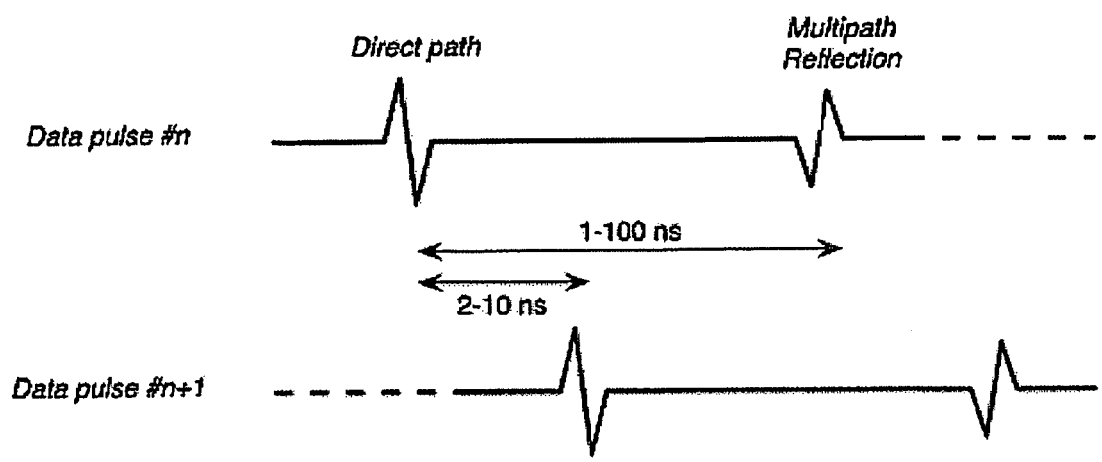
FIG. 7 shows a timing diagram illustrating timing variations of multipath components of a pulse with respect to pulse repetition frequency.

Referring next to FIG. 7 this shows relative timings of transmitted data pulses and multipath components of such pulses as seen by the receiver. As can be seen from FIG. 7 a typical delay span for a multipath reflection is between 1 and 100 ns whereas a typical interval between successive transmitted data pulses is between 2 and 10 ns. It can therefore be appreciated that a multipath reflection of a one pulse may arrive following a direct, line of sight transmission of the next pulse, or even of the next few pulses. The multipath reflections may also be phase inverted subject to different path distortions from the direct path.

In a simple but less preferred arrangement the multiply-accumulate stages 600 of the correlator only integrate multipath energy over the inter-transmit pulse period so that, for example in FIG. 7, multipath components arriving outside the 2-10 ns delay range would be ignored. However in general typical multipath delays are greater than the average inter-transmit pulse period, and thus significant energy may be lost with this approach. The problem is exacerbated if pseudo-random timing jitter is applied to the timing of the transmitted pulses to achieve spectral whitening.

For these reasons it is therefore preferable to implement two or more correlator banks, that is banks of multiply-accumulate units 600 as shown in FIG. 6, parallel to facilitate pipelining of the pulse integrations. Such parallelism implemented by repetition of the correlator logic but in a preferred arrangement this parallelism is achieved by multiplexing the use of a single set of multiply-accumulate chains 600, for example by keeping track of distinct sets of accumulator values in a static RAM (Random Access Memory) buffer memory.

Figure 8:
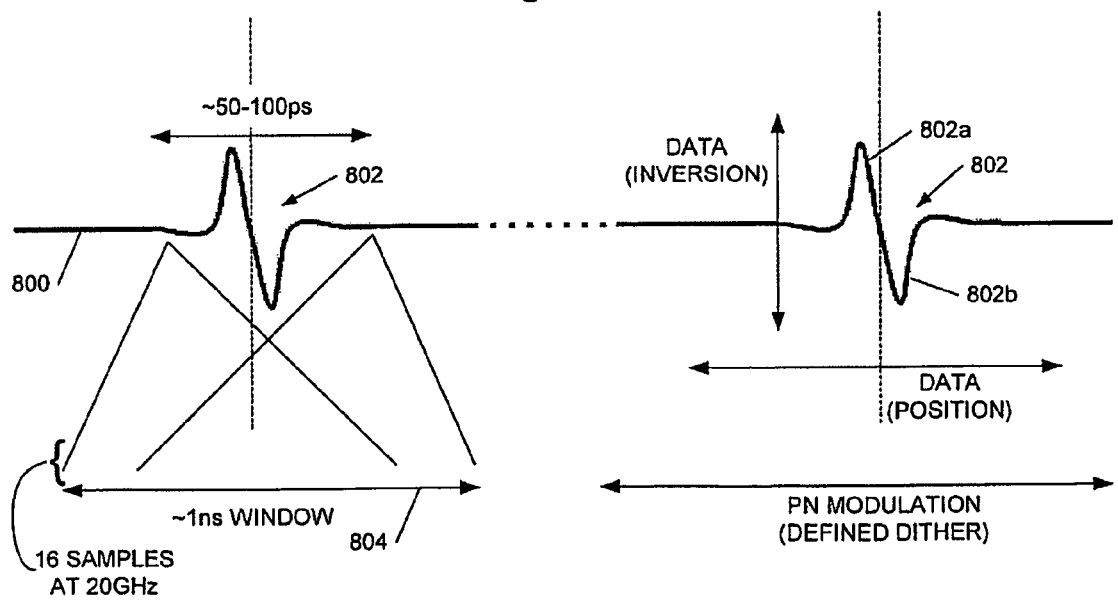
FIG. 8 shows diagrammatically a modulation scheme for use with the demodulator of FIG. 6.

FIG. 8 shows a schematic diagram of a UWB signal employing a preferred modulation scheme for the above described receiver and which may be generated by a transmitter described later with reference to FIG. 10. The signal of FIG. 8 may be employed in a wireless or wired UWB transmission system. A similar signal may be employed in a wireless or wired optical data communications system, although with positive-going pulses from zero rather than a mid-point baseline.

The signal 800 comprises a plurality of wavelets or pulses 802 each of which has either a normal or inverted form to encode a single bit of information data to be transmitted; FIG. 8 shows two normal (rather than inverted) examples of such pulses. As illustrated, according to a preferred such a wavelet or pulse comprises a positive-going portion 802*a* and negative-going portion 802*b*; the order of these two portions may be reversed to invert the pulse, thus facilitating generation of normal and inverted pulses in hardware (in an optical system such phase modulation may be omitted). The pulses 802 have a nominal pulse repetition frequency, for example of the order of 100 MHz. However an additional one or more information data bits may be modulated onto signal 800 by varying the precise position (timing) of a pulse dependent upon the data to be transmitted. For various reasons bi-phase modulation of a rf UWB signal has been the preferred modulation of many applications. However the optical systems we are primarily concerned with here vary the pulse position to encode data onto the optical-UWB signal. In practical schemes it is further preferable to dither the pulse position (in time) in a deterministic manner to further whiten the UWB signal spectrum and hence reduce the overall signal profile and/or facilitate staying within regulatory boundaries. Thus in addition to the precise timing of a pulse being dependent upon variable information data to be transmitted the pulse position may also be dependent upon a pseudo random or PN (pseudo noise) signal. Such a pseudo random sequence is preferably deterministic so that although apparently random once the sequence and start point is known it can be reconstructed in a deterministic manner at the receiver to allow this PN modulation to be effectively subtracted from the received signal or compensated for in other ways.

Preferably the PN modulation is greater than the information data modulation since having a relatively small range of pulse positions about an expected pulse position (once the effects of PN modulation have been compensated for) simplifies demodulation of position-encoded data. In one preferred arrangement, described below, the positions a pulse can take in response modulation by information data are separated by one (or more generally an integral number) of reference (and input) signal sampling intervals. Thus in some preferred embodiments a pulse 802 may take one of eight or 16 different positions in time (although other numbers of positions may be employed) and correlator 514 correlates the input signal with reference signals at all of these positions substantially in parallel to, in a parallel operation, locate the actual or most likely position of a received pulse. As shown in FIG. 8 according to a typical scheme the duration of a single doublet is typically between 50 ps and 100 ps and the correlator bank 514 performs parallel correlation operations over a time window 804 of approximately 1ns, thus identifying the pulse as being in one of around 16 overlapping positions. The skilled person will understand that the above timings, and the number of parallel multiply-accumulate units 600 of correlator 514 may be varied according to the requirements of a particular implementation or application.

Figure 9A:
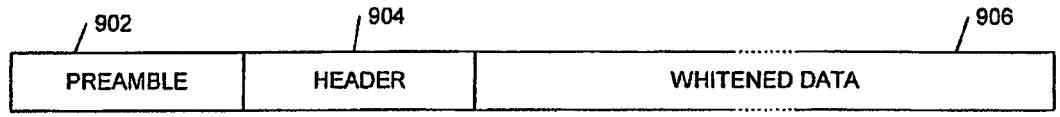
FIGS. 9a and 9b show, respectively, a data frame format and pilot tone pulses for the receiver of FIG. 5.

FIG. 9*a* shows one example of an MAC frame 900 for use with the receiver 500 when receiving a signal of the type shown in FIG. 8. This MAC frame is, however, provided merely for illustrative purposes and many other different frame formats may be employed. The example MAC frame 900 begins with a preamble sequence 902 comprising 32 bits of preamble data, for example pseudo random data for training. This is followed by a 4 byte header comprising a pseudo random sequence identifier and a pseudo random sequence seed (for identifying a starting point in a sequence), for example as a pair of 2 byte values. Different pseudo random sequences may be employed by different transmitters to help avoid collisions between transmitted UWB data signals. The header is preferably structured to give the appearance of noise, and may therefore include a whitening function—for example the pseudo random sequence identifier and seed may each be selected so that the header appears essentially random. The header is followed by payload data 906 which may also be whitened of a fixed or variable length, for example 128 bytes.

Figure 9B:
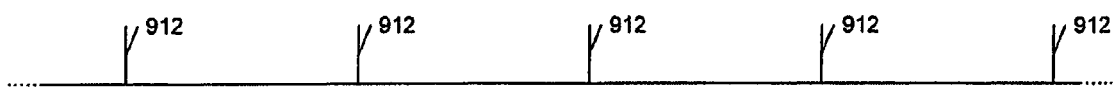

FIG. 9b schematically illustrates the positions of pilot tone pulses within an optical-UWB signal 910 also comprising information-carrying pulses (not shown). In one arrangement one in every 100 pulses comprises a pilot tone pulse and, as can be seen from FIG. 9b, these pilot tone pulses occur at regularly spaced intervals to provide a low-level pilot tone. Optionally the positions (in time) of the pilot tone pulses may be modulated to provide timing jitter, allowing more frequent or stronger pilot tone pulses within the spectral mask, although this is not necessary.

Figure 10A:
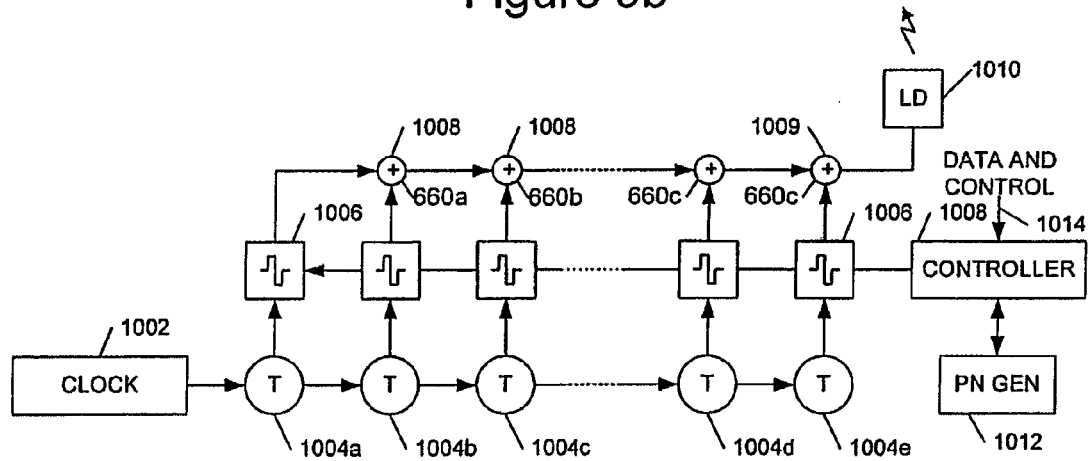
FIGS. 10a and 10b show, respectively, a optical transmitter and a pulse generator for the transmitter.
Figure 10B:
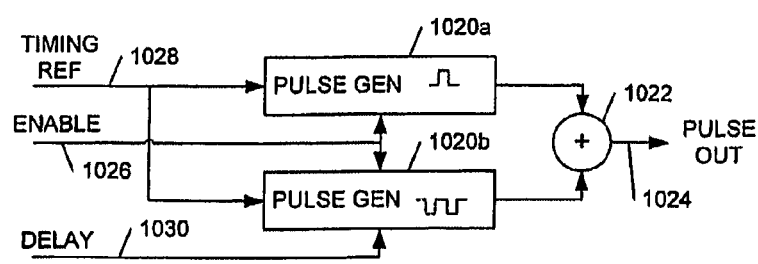

FIGS. 10a and 10b illustrate an example of a transmitter 1000 which may be employed to generate an information data modulated optical signal 800 as described above with reference to FIG. 8. The transmitter structure of FIG. 10 is provided by way of example only and other transmitter structures may also be employed to generate an optical signal for the systems described herein. For simplicity forward error coding arrangements are not explicitly shown in the figure.

Referring to FIG. 10a a clock 1002 operating at, for example, 250 MHz provides a clock signal to a chain of delay elements 1004a-e each providing a delay of, in this example, 40 ps. The successively delayed versions of the clock signal are provided to each of a plurality of monostable pulse generators 1006, each of which also receives an enable and control input from a controller 1008. When enabled by the controller 1008 a monostable 1006 provides an output pulse doublet; the phase (normal or inverted) of the pulse doublet is also controllable by controller 1008. The outputs from all of the monostable pulse generators 1006 are combined, in this example in summers 1009 and the combined output is provided to an optical emitter 1010, for example an LED or laser diode (in this block diagram the block 1010 also includes suitable drive circuitry for the emitter). The controller 1008 receives a pseudo random sequence input from a pseudo noise generator 1012, and also receives a data and control input 1014, for example from a preceding forward error correction block and from a transmitter control processor. The data and control input receives information data to be transmitted by the transmitter and control signals such as a timing control signal to control when the transmitter is to transmit and/or pseudo noise sequence selection and start point control signals. The controller 1008 may comprise a state machine implemented in either software or dedicated hardware or a combination of the two.

In operation the controller 1008 controls the timing of transmitted UWB pulses and the phase (normal or inverted) of these pulses by providing appropriate enable and phase control signals to the monostable pulse generators 1006 which are then triggered to provide output pulses at the corresponding time by the phase tapped clock from clock signal generator 1002.

Referring now to FIG. 10b this shows an example of one implementation of a monostable 1006 for the transmitter of FIG. 10a. The monostable comprises two pulse generators 1020a, b, one providing a positive-going pulse, the other providing a negative-going pulse, outputs from these two pulse generators being combined in a summer 1022 to provide a pulse doublet output signal 1024. Both of pulse generators 1020a and 1020b are controlled by a common enable line 1026 which when asserted enables the pulse generators to provide an output pulse in response to an input timing reference signal on line 1028, but which when de-asserted disables the pulse generators from providing their outputs.

In an rf system pulse generator 1020b may in addition have a delay signal input 1030 which delays the production of its output pulse by two cycles to effectively invert the pulse doublet. Thus according to whether or not the delay input 1030 is asserted a pulse doublet comprising either a positive or negative-going pulse or a negative then positive-going pulse is provided. A transmitter such as a transmitter 1000 of FIG. 10 may be combined with an optical receiver, for example providing an optical input for the front end of the receiver of FIG. 5, to provide an optical transceiver. In this case it is preferable that the transmitter and receiver portions of the transceiver are synchronised to a common PRF clock to avoid self-collision, that is to avoid jamming reception of transmissions from a remote transmitter by local transmissions.

Referring next to FIG. 11, this shows details of a receiver similar to that shown in FIG. 5, but intended for optical use. In particular details of the signal acquisition and locking system, including details of the reference signal capture signal, are shown. Like elements of those to FIGS. 5 and 6 are shown by like reference numerals. Broadly speaking the functions of the PSR lock acquisition module 604 are provided by a phase control processor and the functions of the pattern sequencer 602 of FIG. 6 are provided by a combination of a reference waveform data table and of a PSR sequence generator.

The receiver includes a photodiode 202 to provide an optical input for the receiver, the photodiode interfacing to analog front end and A/D converter 504. This front end provides a plurality of examples of a received optical input signal in parallel to correlator 514 and each set of input signal samples is processed by a correlator comprising one of multiply-accumulate units 600 of correlator 514 to correlate the set of received samples in parallel with sets of reference signals representing differently delayed pulses. The sets of samples defining differently delayed versions of a referenced signal pulse are derived from a waveform of a pulse stored in a reference waveform data table 1100. A reference received pulse is preferably stored in this table as a pulse shaped for each of a set of multi part components of the pulse together with data representing delay intervals between these multipath components, as shown in FIG. 11b. However differently delayed versions of a pulse may be provided by accessing a common wave shape data store for the pulse. As shown in FIG. 11b a reference or template waveform for a single received pulse having a plurality of multipath components comprises sample data 102 for a plurality of successive sample points of a multipath component of a pulse followed by delay data 1104 representing an interval between that multipath component of the pulse and the next multipath component. An input 1106 allows reference waveform data to be written into the referenced waveform data table 1100. Reference waveform data is provided to the correlator 514 from the data table 1100 under control of a PSR sequence generator 1108 in synchronism with a PRF clock input 1110.

A phase control processor 1112 provides a PRF clock to sequence generator 1108 and reference waveform data to data table 1100. The phase control processor includes a processor and non-volatile program memory storing program code for pilot tone identification, to provide a software phase locked loop (PLL), for multipath component identification, and for template wave shape retrieval and storage. A clock 1114 provides a clock signal to the phase control processor and receives tracking data from processor 1112 comprising a time advance/retard signal for controlling the phase of the clock and a frequency increase/decrease for controlling the frequency of the clock when the phase needs to be consistently advanced/retarded. The clock 1114 is thus adjustable to track movement of the receiver with respect to the transmitter by means of systematic adjustment in the clock timing (which are generally small compared with the modulation). As described further below clock 1114 acts as a slave to a similar clock in a remote transmitter and thus acts as a link clock; typically it has a frequency in the range 50-250 MHz.

The phase control processor 1112 provides a control output to a transmitter 1116, such as transmitter 1000 in FIG. 10, to control the transmitter to provide an optical signal from an optical emitter 1118 for use in training receiver. The control processor 1112 also receives a start of frame input signal 1120 from a MAC state machine implemented in either hardware or software. The phase control processor 1112 further receives a set of inputs 1122, one from each accumulator of correlator 514, and a further input 1124 from the output of discriminator 612.

Broadly speaking, in operation the phase control processor 1112 programs the reference waveform data table 1100 with an initial, predetermined wave shape and then identifies the signal pilot tone and runs a software phase lock loop to lock onto this tone to provide a time reference. The processor then uses this to identify the wave shape of a received pulse, including its multipath components. Optionally the processor 1112 may apply a Fast Fourier Transform (FFT) filter to remove narrow band interference. Broadly speaking to locate the multipath components of a transmitted pulse the phase control processor 1112 scans a sample window by shifting the phase of the PRF clock with respect to the internal clock from clock generator 1114, integrating to obtain an average sampled data wave shape. Initially the multipath component with the strongest signal is identified and the shape of this multipath component of the pulse determined from the input data, and then the processor hunts for other multipath components both backwards and forwards from the strongest signal (because the direct line of sight pulse may not be the strongest). As previously described the correlator operates with blocks of eight or 16 samples and these blocks are effectively positional in time with respect to the link clock reference from clock generator 1114. Preferably the multipath component pulse tracking procedure is repeated at a frequency in the order of kilohertz in order to track variations in the multipath channel and, in embodiments where implemented, to obtain physical location information relating to the receiver's position. In wired optical transmission systems the multipath environment may be quasi-static in which case a channel characterisation procedure such as that described above may only be applied at switch on or, for example, when the error rate increases above a threshold.

Figure 11A:
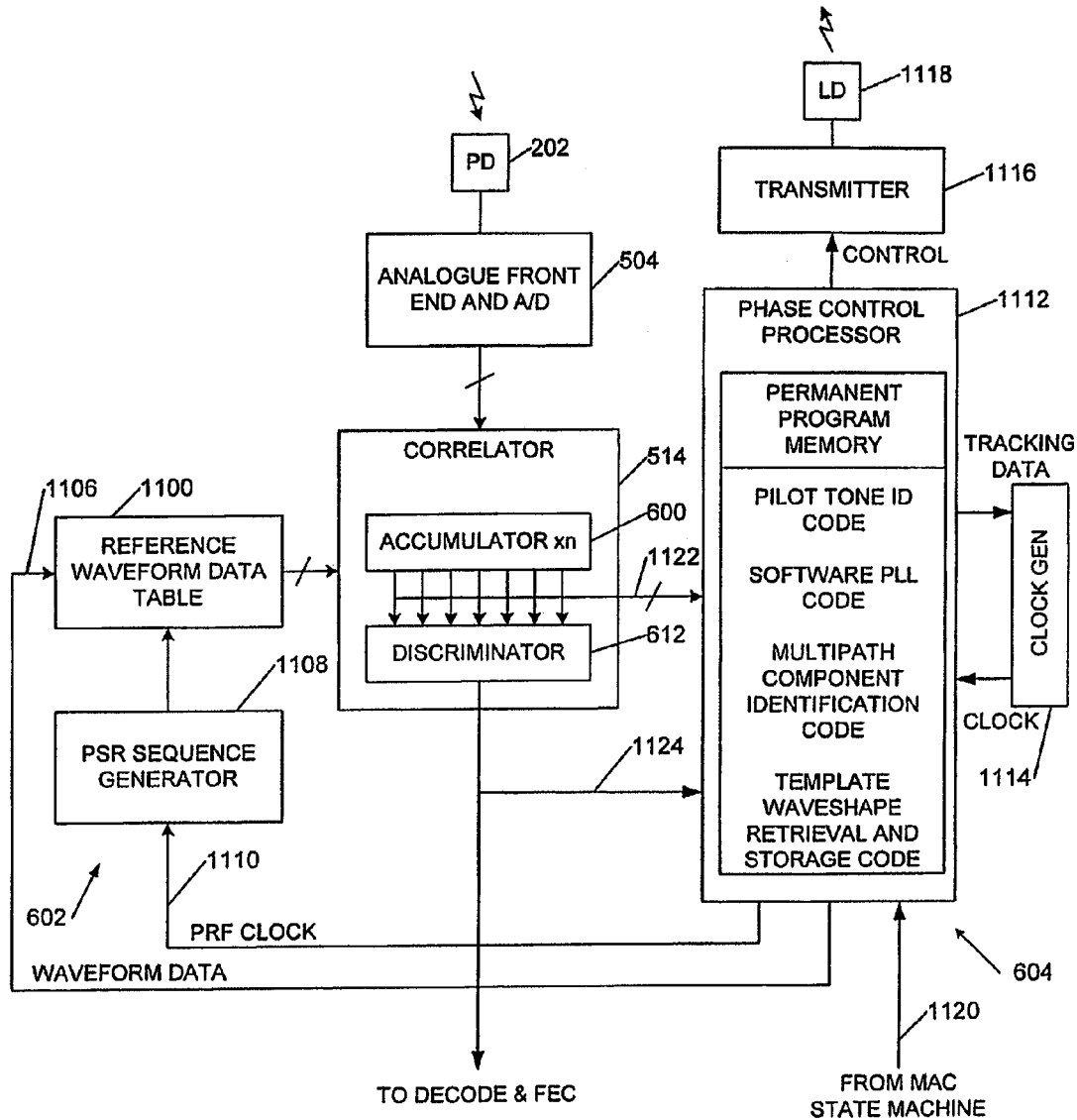
FIGS. 11a and 11b show, respectively, a signal acquisition and tracking system for the receiver of FIG. 5, and a waveform memory data format.
Figure 11B:
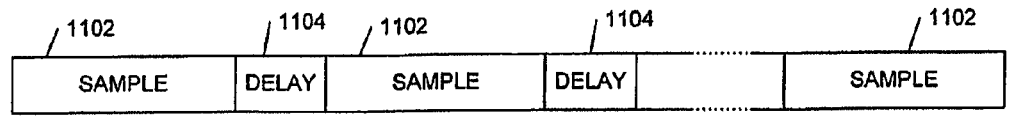

In the arrangement shown in FIG. 11a the phase control processor receives sampled input signal data via the correlator 514. This simplifies the architecture of the receiver, although in other arrangements processor 1112 may receive sampled input signal data directly from analog front end 504. To obtain sample input data from correlator 514 the input data may be correlated with a delta function such as a spike or impulse written into the wave form data table.

Figure 12A:
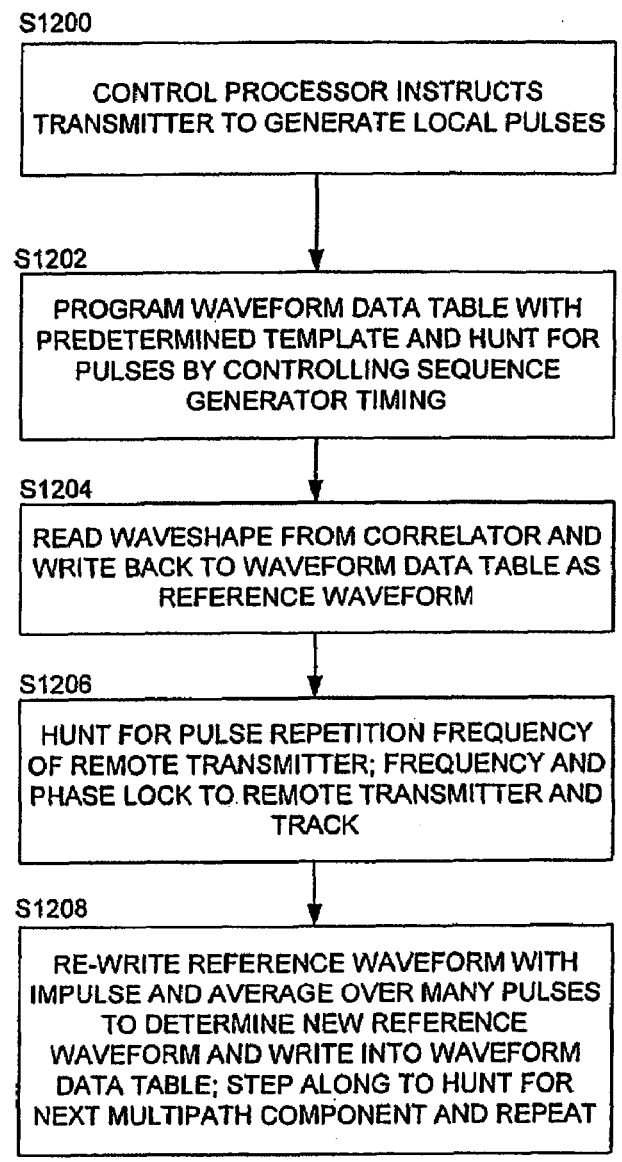
FIGS. 12a and 12b show, respectively, a flow diagram of a signal acquisition procedure, and a diagrammatic illustration of a signal hunt process.

FIG. 12a shows a flow diagram explaining further the operation of the phase control processor 1112 of FIG. 11a. To initially calibrate the receiver front end the control processor, at step S1200, instructs transmitter 1116 to transmit local optical pulses under control of the local clock generator 1114. These pulses are received at a very high signal level and, moreover, processor 1112 knows when these pulses are transmitted and thus knows at what position in time the received input data is expected to comprise a transmitted pulse (taking account of the delay introduced by the separation between transmit antenna 1118 and receive antenna 502 (typically one or a few centimeters)).

At step S1202 processor 1112 programs wave form data table 1100 with a predetermined template, in particular an impulse, and hunts for the transmitted pulses by controlling the timing of PSR sequence generator 1108. This is conveniently performed by inhibiting generation of a pseudo random sequence so that the phase of the output of generator 1108 may be varied by using the PSR seed as a phase offset adjust. Once the locally transmitted pulses are identified the wave shape of a pulse as received and digitised by analog front end 504 is read from correlator 514 and written into the referenced wave form data table to serve as an initial reference wave form. This in effect calibrates out phase and gain non-linearities in the receiver front end. Although the locally received signal is strong the wave shape data written into the data table 1100 may optionally comprise an average of a plurality of received pulses.

Figure 12B:
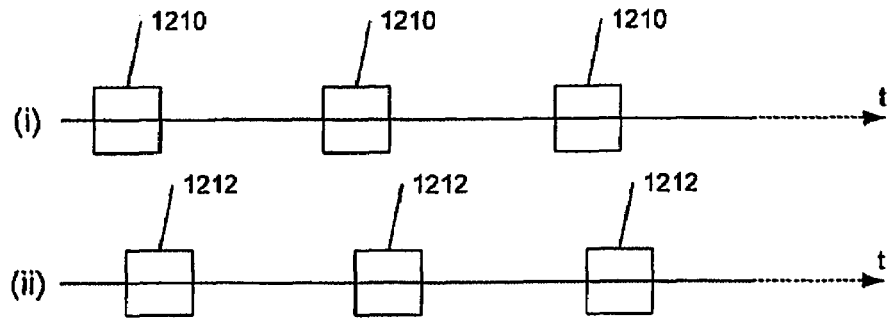

Once this initial calibration has been performed the phase control processor 1112 has the more difficult task of frequency and phase locking onto a signal from a remote transmitter and of tracking this signal. Thus at step S1206 processor 1112 controls the receiver to hunt for a signal at the pulse repetition frequency of the remote transmitter, that is at the pilot tone of the remote transmitter. The pilot tone frequency may not be known exactly but in preferred arrangements is limited to a small set of possible frequencies such as 50 MHz, 100 MHz, and 250 MHz and thus the receiver can pick each of these frequencies in turn to look for incoming signals. The process of hunting for a signal at PRF is illustrated in FIG. 12b. The receiver system first runs a correlation in a set of windows 1210 spaced by intervals at the PRF frequency, averaging the correlation results over a plurality of such windows and, if no significant correlation is found, slips the windows, at the same frequency, to a slightly delayed position 1212 as shown in timeline (ii) to repeat the correlation and averaging procedure until pulses at the PRF are found. Once the PRF frequency has been found, because the correlator 514 provides a plurality of outputs corresponding to a small range of delays either side of a desired time position it is straightforward to track variations in the PRF. The clock generator 1114 (and the equivalent in the transmitter) is preferably crystal controlled and thus relatively stable and varies only slowly compared with the kilohertz PLL tracking frequency. The more difficult task is to locate the remote transmitter PRF in the first place, particularly as a pilot tone pulse is transmitted for of the order of only one in 100 pulses, and because the signal is relatively low level, especially at longer ranges. These difficulties are addressed by averaging over a relatively long period in order to identify the systematic pilot tone impulses which appear at fixed times and distinguish, for example, from other pulses which appear effectively at random times. Depending upon the strength of the signal and upon the range and transmit channel it may take as long as one or a few seconds to lock onto the relevant pilot tone as the correlator windows are slipped, which allows averaging over an extremely large number of pulses.

Once the phase control processor has locked onto the PRF of the remote receiver the processor can rely on the relative stability of clock generator 1114 and can thus rewrite the referenced wave form data table 1100 with an impulse and average over a plurality of pulses, typically between 100 and 1000 pulses, to determine the reference wave form for the transmit channel, and can then write this into the wave form data table. The number of pulses over which the signal needs to be averaged depends upon the range—one pulse may be enough at one meter and average of 104 pulses may be necessary at a range of 30 meters. Once the reference wave form for a first multipath component of a transmitted pulse has been identified the phase control processor 1112 can hunt backwards and forwards from this to identify the next multipath component of the pilot tone, and this can be repeated to determine data for a plurality of multipath components of a transmitted pulse. The number of multipath components for which data is acquired depends upon a trade off between acquisition time and system sensitivity (capturing energy from more multipath components facilitates greater sensitivity but takes longer to acquire). It will be appreciated that once the pulse shapes and delays for multipath components of a pulse have been located in time and samples stored tracking the variations of these over time is relatively straightforward and may be accomplished by periodically averaging over say 100 to 1000 pulses, for example by time multiplexing correlator in a similar way to that described below.

Figure 13A:
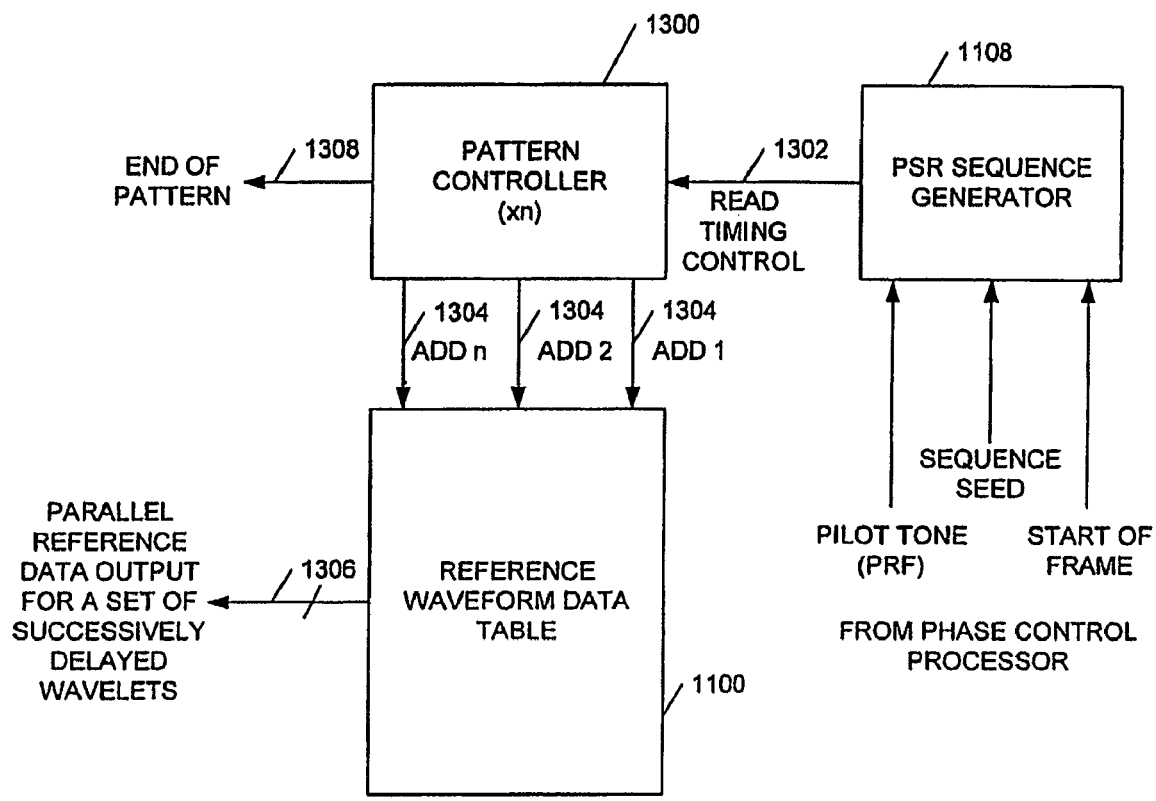
Figure 13B:
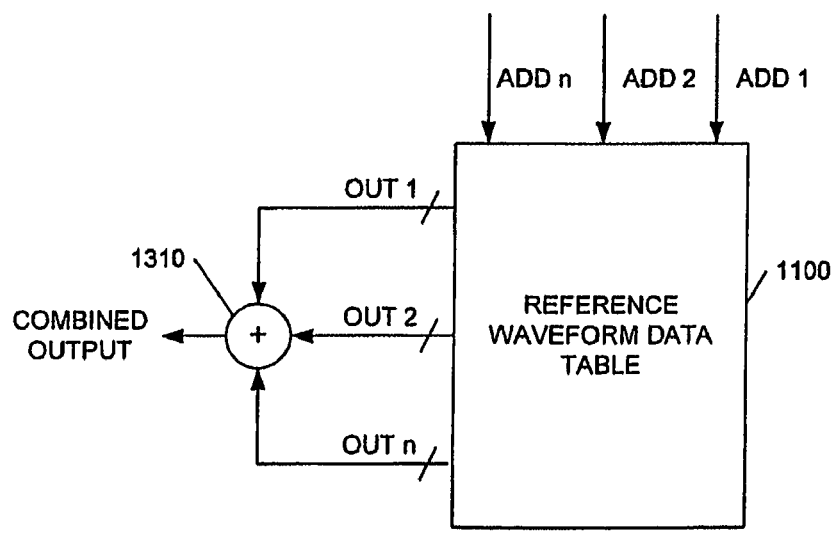
Figure 15A:
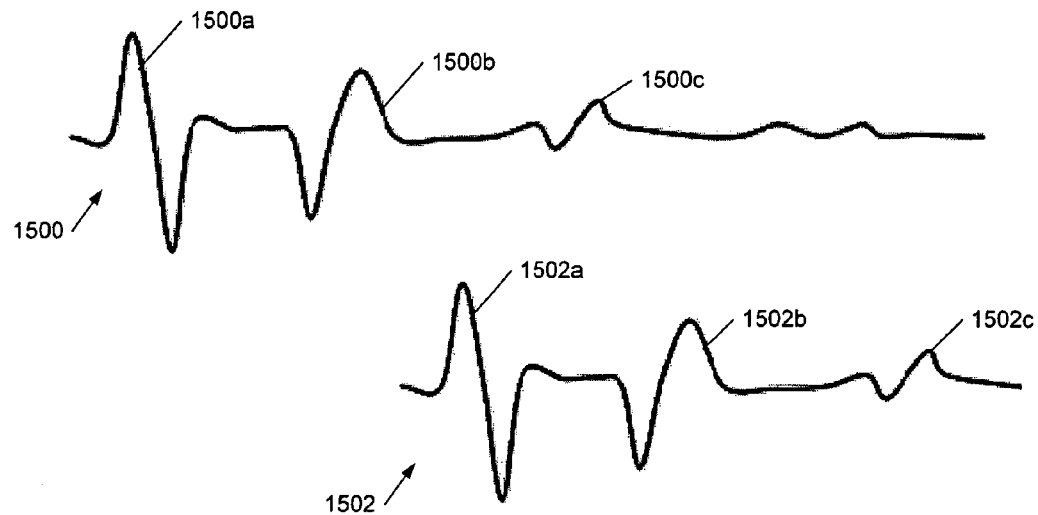
FIGS. 15a and 15b show, respectively, received signals with interleaved multipath components, and a diagrammatic illustration of the operation of the correlator of FIG. 14.

FIGS. 13*a* and 13*b* show details of the reference wave form generation system. The PSR sequence generator 1108 receives control signals from the control processor 1112 comprising a pilot tone to control the timing of the reference wave form generation, and a starter frame signal and a sequence seed to control the pseudo random sequence modulation for pulse position dithering, and provides a read timing control output 1302 to a pattern controller 1300. Referring ahead to FIG. 15*a*, this shows the received multipath components of two successively transmitted pulses 1500 and 1502, each with a plurality of multipath components 1500*a-c*, 1502*a-c*. It can be seen that the multipath components 1500*a, b* of pulse 1500 arrive before the start of pulse 1502 but that the multipath component 1500*c* of pulse 1500 arrives between multipath components 1502*a* and 1502*b* of pulse 1502. In order to correlate the received signal with a reference wave form corresponding to pulse 1500 (or 1502) the reference wave form data table 1100 should preferably be able to provide the appropriate multipath component of the pulses at the appropriate times even when these are interleaved as shown. Although this is not essential it is preferable in order to be able to retrieve energy from more multipath components of a received signal.

Referring back now to FIG. 13*a* pattern generator 1300 provides a plurality of outputs 1304 for providing reference wave forms corresponding to a plurality of transmitted pulses having overlapping multipath components. Thus, for example, if it is desired to process overlapping or interleaved multipath components from two successive transmitted pulses pattern controller 1300 provides two address outputs 1304 for addressing the wave form data table at appropriate times to provide portions of the reference wave form corresponding to the overlapping or interleaved portions of the multipath components. Thus referring again to the example of FIG. 15*a* pattern controller 1300 provides a first address output for controlling data table 1100 to provide multipath components 1500*a, b, c* and a second address output for addressing the table to provide the reference wave shapes for multipath components 1502*a, b, c* at appropriate times. It will be appreciated that the number of address outputs of pattern controller 1300 depends upon the delay span of the number of significant multipath components of a pulse as compared with the inter-transmit pulse spacing. The reference wave form data table 1100 provides an output 1306 which comprises a time ordered combination of the multipath components of successfully transmitted components in the example of FIG. 15*a* multipath components 1500*a*, 1500*b*, 1502*a*, 1502*c*, 1502*b* and so forth. In a preferred arrangement a single set of outputs provides these multipath components in a time multiplexed fashion for use with correlator 514 also operating in a time sliced or multiplexed configuration. However an alternative arrangement is illustrated in FIG. 13*b* in which data table 1100 has a plurality of sets of outputs, one for each transmitted pulse the receiver is concurrently able to process, which are combined in a summer 1310 and provided as a combined output for subsequent correlation.

Referring in more detail to the parallel data outputs from the reference wave form data table, the data table memory is configured to provide a plurality of blocks of reference signal data in parallel, each block of data being delayed with respect to a previous block of data. A block of data may comprise, for example, eight or 16 sample values of the stored reference wave form, preferably defining a multipath component of a pulse such as a one of components 1500*a, b, c* of FIG. 15*a*. The blocks preferably overlap in time and in one arrangement each block is delayed from the previous block by one sample, 16 blocks defining 16 successively delayed multipath pulse components being output in parallel. In this example this requires a bus comprising 256 parallel outputs from reference output data table 100, but the majority of these outputs may be provided simply by appropriate wiring since 16 blocks each of 16 samples, each delayed by a sample requires only 32 parallel sample value outputs. Each of these sample value outputs, it will be appreciated, may comprise a single or multi-bit value, depending upon whether or single or multi-bit A/D conversion is employed. Depending upon the duration of a multipath component of a pulse such as multipath component 1500*a* of FIG. 15*a* is stored within the reference wave form data table, a block of reference data may be added with zeros at either or both ends. The use of a reference wave form data table provides important benefits to the receiver system, in particular allowing use of a lower quality receiver analog front end than would otherwise be acceptable as the above described process of self-calibration, storing referenced wave form data table 1100, can compensate for distortion within the receiver as previously described.

In operation the PSR sequence generator 1108 is responsive to the pseudo random sequence employed for transmitting the data to control the read timing from the reference wave form data table to compensate for the pseudo random (but deterministic) time modulation imposed on the variable, information—dependent phase and position modulation. Pattern controller 1300 also provides an end of pattern output signal 1308 for use in resetting the correlator as described further below.

Figure 14:
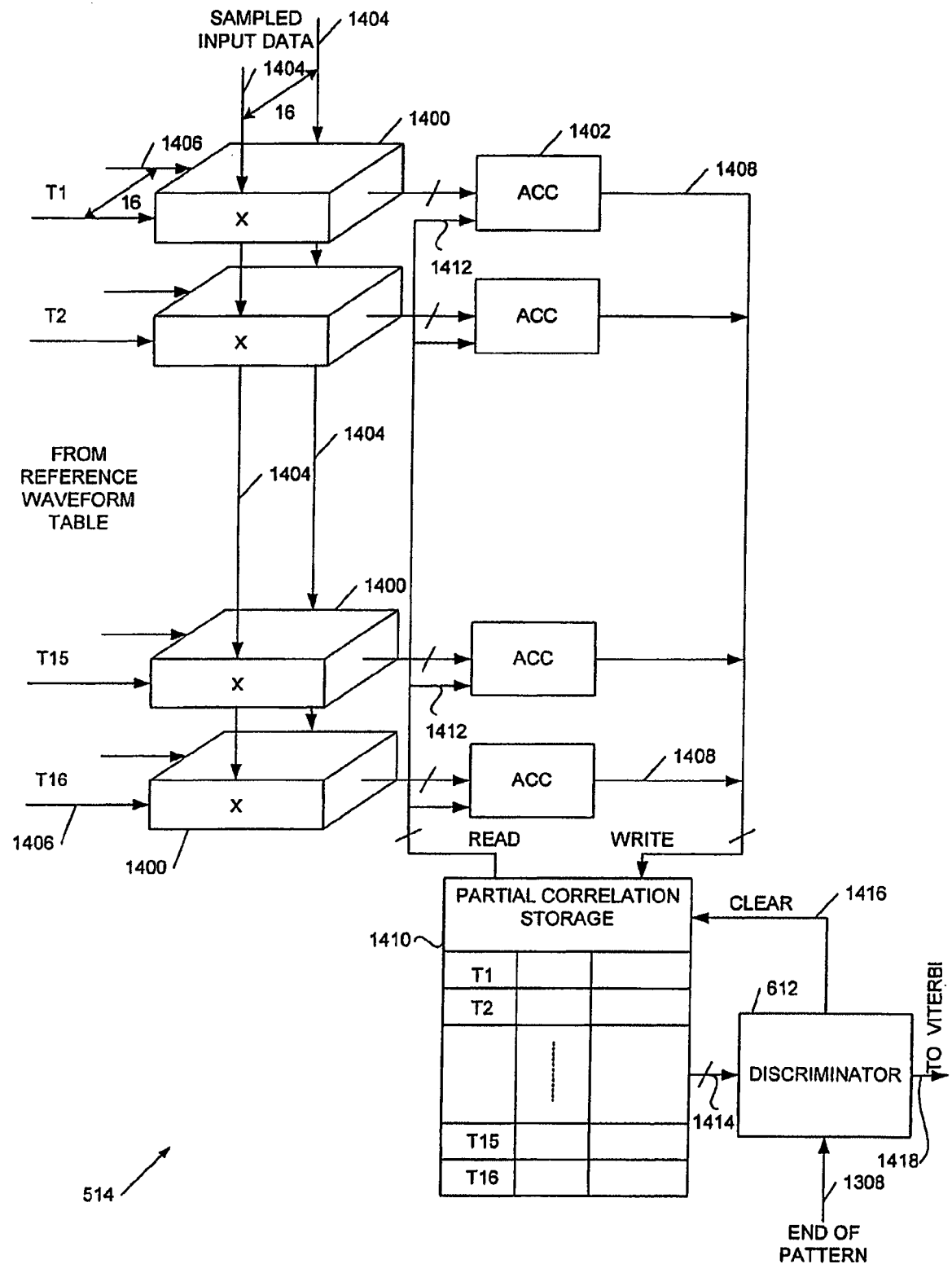
FIG. 14 shows a block diagram of a correlator for the demodulator of FIG. 6.

FIG. 14 shows details of the configuration of the multiply-accumulate units of correlator 514. The correlator comprises a plurality, in one configuration 16, of multiply units 1400 each coupled to a respective accumulator 1402. Each multiplier unit 1400 receives the same block 1404 of sampled input data, as illustrated comprising 16 successively delayed samples (either one or multi-bit values). Each multiply unit 1400 also receives a block of reference signal samples 1406, in one configuration comprising 16 successive samples of the reference signal wave form, from data table 1100, but each of blocks 1406 is successively delayed so that the sampled input data is correlated in parallel by multiplier units 1400 with portions of the referenced signal wave form spanning a range (as illustrated, 16) of successive time slices of the referenced wave form. The effect of this is to slide the sampled input data block or time slice along the referenced wave form until a correlation is found but it is easier in practice to firstly change the referenced wave form delay rather than the sampled received data delay, and secondly to perform a plurality of correlation in parallel rather than employ a single slide window.

Each of multiply units 1400 comprises a multiplier to multiply each input data sample with the corresponding reference data sample and provide an output to the corresponding accumulator 1402 so that the accumulator accumulates a correlation value from all (in this case 16) correlation operations in parallel. Each accumulator has an output 1408 coupled to a partial correlation store 1410 for writing an accumulated correlation value into the store. Each accumulator also has an input 1412 from a read output of store 1410 to allow a partial correlation value written into the store to be read back from the store and added to a further correlation value in each respective accumulator. Writing of data into the store and reading of data from the store is controlled by the phase control processor 1112. The partial correlation store 1410 comprises a plurality of sets of memory locations, each set of memory locations storing a set of partial correlation values, one from each multiply-accumulate module (T1 . . . T16). Storage is provided for as many sets of partial correlation values as is needed to process a desired number of transmitted pulses as overlapping or interleaved multipath components. Thus, for example, two sets of memory locations for partial correlation values are provided for storing partial correlation values where multipath components of two successively transmitted pulses overlap or interleave.

Data from each of the plurality of memory locations of a set of partial correlation results is provided on an output 1414 to discriminator module 612. Discriminator 512 also provides a memory clear output 1416 for clearing or setting to zero a set of partial correlation values, and receives an end of pattern signal 1308 from pattern controller 1300. Discriminator 612 provides an output 1418 to subsequent forward error correction modules such as a Viterbi decoder. Although reference has been made to store 1410 storing partial correlation, once the correlation of a complete set of multipath components of a received signal pulse is complete the accumulated correlation values from outputs 1418 are written into store 1410 thus providing a set of complete correlation values, that is taking account of all multipath components it has been decided to process, and these complete correlation values are available to the discriminator 612 via bus 1414.

Figure 15B:
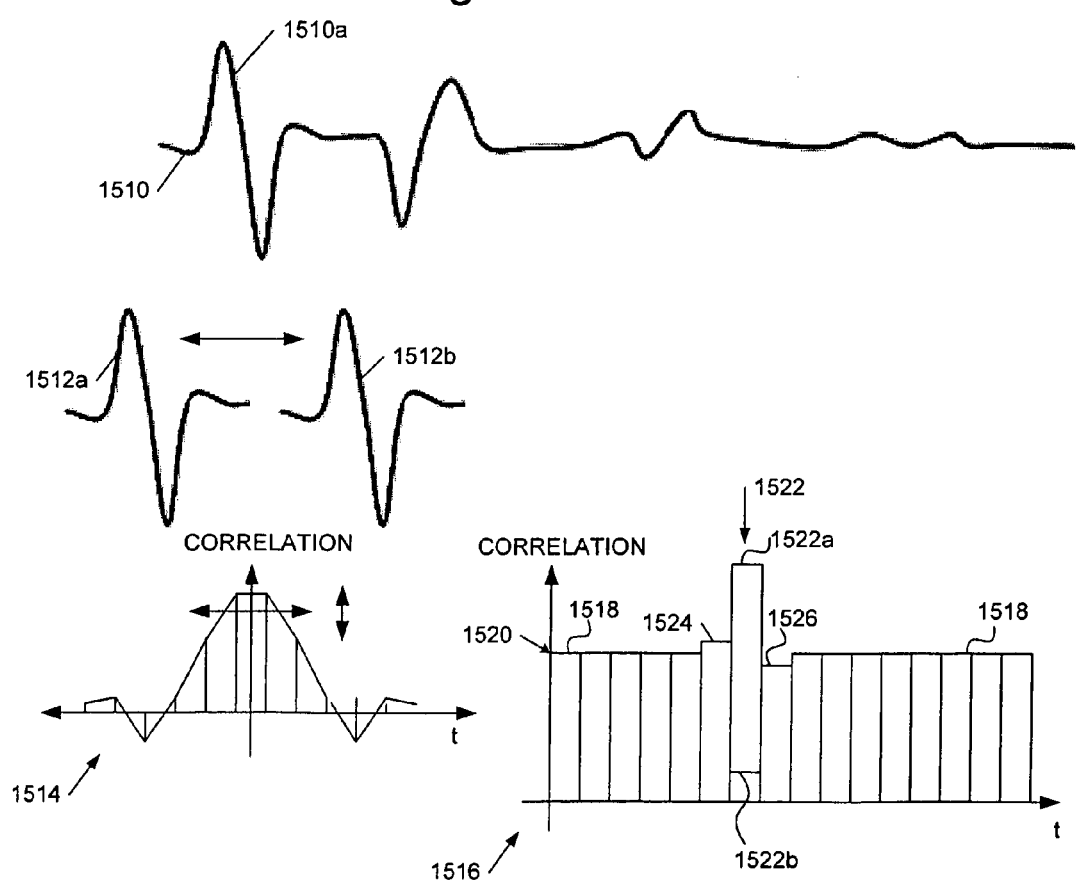

To illustrate the operation of the correlator 514 of FIG. 14 it is helpful to refer to FIG. 15*a*. FIGS. 15*a* and 15*b* show waveforms from rf UWB signals but similar principles apply when correlating optical UWB-type signals.

Broadly speaking the procedure is to correlate (accumulate) the first received multipath component 1500*a* and to dump this into store 1410, and then to correlate the next multipath component 1500*b*, also accumulating the previously stored partial correlation for multipath component 1500*a* by reading this from store 1410 adding this to the partial correlation value of multipath component 1500*b*, and the total accumulated set of correlation values is then written back into store 1410. This process is continued until a multipath component of a subsequent pulse is encountered, in this case multipath component 1502*a* of pulse 1500. The pattern controller 1300 of FIG. 13 then controls the reference wave form data table 1100 to provide a pulse shape appropriate for correlating with multipath component 1502*a* and following the correlation operation the result of this correlation is dumped into a separate set of memory locations within store 1410, this set of memory locations being allocated to the second pulse. The correlation operation for multipath components of the received signal continues with the partial correlation results being written into the set of memory locations for either the first or second pulse as appropriate, the pattern generator controlling the wave form data table to generate a reference wave shape for the appropriate multipath component. Thus continuing with the example of FIG. 15*a* multipath component 1500*c* of the first pulse is next accumulated with the partial correlation value read from store 1410 for the first pulse and dumped back into store 1410. In this case this is the final processed multipath component pulse of 1500 though the accumulated correlation values in store 1410 for the first pulse can then be taken as complete correlation values and processed by discriminator 612. The signal indicating that the complete set of multipath components has been correlated is provided by pattern controller 1300 since this controller is able to determine that the final stored multipath component has been processed. However correlation of pulse 1502 continues with multipath component 1502*b* and when the first multipath component of a third pulse (is not shown in FIG. 1500*a*) received the set of partial correlation values which was previously used for pulse 1500 (and which was cleared by discriminator 612 after the complete correlation values for pulse 1500 were processed) is available for use for accumulating correlation values for this third pulse.

FIG. 15*b* illustrates, diagrammatically, the correlation of a multipath component 1510*a* of a received signal pulse 1510 with a set of referenced pulses 1512*a*, *b* of which, for clarity, only two are shown. The referenced signal pulses are time shifted to either side of the received multipath component 1510*a* and correlation with each of these referenced signal pulses provides a correlation value as schematically illustrated in graph 1514. The shape of this curve, and the height and width of its peak may alter depending upon the received signal and referenced signal shape. In FIG. 15*b* a set of (full) correlation values output from storage 1410 to discriminator 612 on bus 1414 is diagrammatically illustrated by bar chart 1516 in which each bar 1518 represents an accumulated correlation value for one of the delayed versions of the referenced signal multipath component 1512. It can be seen that most of the accumulated correlation values are close to a mean level 1520 but one of the accumulated values represented by bar 1522 is significantly different from the others. This represents the most likely pulse position; the bars 1524, 1526 to either side of it represents next most probable pulse positions. Bar 1522*a* is significantly greater than the average 1520 which applies a positive correlation (normal pulse) whilst bar 1522*b* has a correlation value which is significantly less (more negative) than the average which implies a negative correlation that is an inverted received signal pulse as compared with the reference. Thus the correlator of FIG. 14*b* is able to co-determine both the likely position (in time) of a received signal pulse and also the phase (normal or inverted) of the pulse and hence to co-determine information data modulated to both pulse position and pulse phase simultaneously. The use of both position and phase simultaneously to encode information data significantly enhances the information data carrying capacity of the system.

In the above described system the correlator is employed for correlating successive multipath components of received signal pulses. However essentially the same arrangement can also be used for accumulating relation values for successively transmitting impulses carrying the same data. In other words a transmitter and/or receiver may employ redundancy, using two or more transmit pulses to carry substantially the same data, at the receiver processing these as though they were merely multipath components of a single pulse. This reduces the effective data rate (halving data rate where two pulses are received instead of one to transmit a given symbol) but potentially increases the range of a transmission system by providing greater energy per transmitted symbol. Such an arrangement may be employed adaptively, reducing the data rate but increasing reliability where transmission conditions are difficult or at the edge of range of a system. The reduction in effective data rate may be partially compensated for by increasing the pulse repetition frequency; the transmit power may also be adaptively controlled to facilitate this.

The skilled person will appreciate that embodiments of the above described receivers and transmitters are applicable to a wide range of optical communications systems, both wired (fibre optic) and wireless (i.e. free-space optical). Although embodiments of the system have been described with specific reference to pulse position modulation, applications of the techniques described herein are not limited to this form of modulation and may be employed with other types of modulation which may be employed with optical signals including, for example, on-off keying (OOK), OFDM-based modulation and even analogue rather than digital modulation.

No doubt alternatives will occur to the skilled person. It will be understood that the invention is not limited to the described embodiments and encompasses modifications apparent to those skilled in the art lying within the scope of the claims appended hereto.

What is claimed is:

1. An optical data communications receiver for receiving data encoded using optical pulse position, the receiver comprising:
    an optical signal reception device;
    a reference signal memory for storing a reference channel response signal;
    a reference signal acquisition system coupled to said optical signal reception device and to said reference signal memory to determine said reference channel response signal from a received optical signal and to store said determined reference in said reference signal memory;
    a correlator coupled to said reference signal memory and to said optical signal reception device for correlating a received optical pulse with said stored reference channel response signal to determine said optical pulse position; and
    an output coupled to said correlator to provide pulse position data for said received optical pulse.

2. An optical data communications receiver as claimed in claim 1 wherein said reference signal acquisition system is configured to acquire a plurality of said reference channel response signals from a plurality of different optical transmitters and to store said plurality of reference channel response signals in said reference signal memory.

3. An optical data communications receiver as claimed in claim 1 comprising a plurality of said correlators coupled to said reference signal memory and to said signal reception device at successive respective relative delays between said stored reference channel response signal and said received optical pulse to determine said optical pulse position.

4. An optical data communications receiver as claimed in claim 1 wherein said optical pulse position is modulated by a pseudorandom sequence, the receiver further comprising a pseudorandom sequence generator for tracking said pseudorandom modulation.

5. An optical data communications receiver as claimed in claim 1 having a receiver front end including said optical signal reception device, and said front end further comprising an analogue-to-digital (A/D) converter coupled between an output of said optical signal reception device and said correlator.

6. An optical data communications receiver as claimed in claim 5 wherein said front end is configured to implement a peak detect Function for said optical signal reception device.

7. An optical data communications receiver as claimed in claim 6 wherein said A/D converter has a non-linear conversion Function to implement said peak detect Function.

8. An optical data communications receiver as claimed in claim 5 wherein said A/D converter has an offset to implement a peak detect Function.

9. An optical data communications receiver as claimed in claim 5 wherein said A/D converter comprises a one bit A/D converter.

10. An optical data communications receiver as claimed in claim 5 wherein said receiver front end further comprises a received signal level adjuster to adjust an input signal to said analogue-to-digital converter.

11. An optical data communications receiver for receiving data encoded using optical pulse position, the receiver comprising:
    an optical signal reception device;
    a reference signal memory for storing a reference channel response signal, wherein said reference channel response signal comprises a plurality of multipath components;
    a correlator coupled to said reference signal memory and to said optical signal reception device for correlating a received optical pulse with said stored reference channel response signal to determine said optical pulse position; and
    an output coupled to said correlator to provide pulse position data for said received optical pulse.

12. An optical data communications receiver as claimed in claim 11 wherein said reference signal memory has a data structure defining said channel response signal as at least two said multipath components separated by a delay.

13. An optical data communications receiver as claimed in claim 11 wherein said correlator includes partial correlation storage to accumulate a plurality of partial correlations for said multipath components to thereby correlate interleaved multipath components of successively transmitted optical pulses.

14. An optical data communications receiver for receiving data encoded using optical pulse position, the receiver comprising:
    an optical signal reception device;
    a reference signal memory for storing a reference channel response signal;
    a correlator coupled to said reference signal memory and to said optical signal reception device for correlating a received optical pulse with said stored reference channel response signal to determine said optical pulse position, wherein said correlator is configured to correlate, within a time window, a plurality of samples of said received optical pulse with a plurality of samples of stored reference channel response signal; and
    an output coupled to said correlator to provide pulse position data for said received optical pulse.

15. An optical data communications receiver for receiving data encoded using optical pulse position, the receiver comprising:
    an optical signal reception device;
    a reference signal memory for storing a reference channel response signal;
    a correlator coupled to said reference signal memory and to said optical signal reception device for correlating a received optical pulse with said stored reference channel response signal to determine said optical pulse position, wherein said optical pulse position is modulated by a pseudorandom sequence;

a pseudorandom sequence generator for tracking said pseudorandom modulation, wherein said sequence generator is coupled to one or both of said reference signal memory and said correlator for correlating said received optical pulse with said stored reference channel response signal at positions in time determined by said pseudorandom sequence; and an output coupled to said correlator to provide pulse position data for said received optical pulse.

16. An optical data communications receiver as claimed in claim 15 wherein said correlator is configured for correlating at least two said positions in time in parallel, each of said two positions corresponding to a possible value of an encoded bit of said data.

17. An optical data communications receiver for receiving data encoded using optical pulse position, the receiver comprising:

an optical signal reception device;

a reference signal memory for storing a reference channel response signal;

a correlator coupled to said reference signal memory and to said optical signal reception device for correlating a received optical pulse with said stored reference channel response signal to determine said optical pulse position, wherein said optical pulse position is modulated by a pseudorandom sequence;

a pseudorandom sequence generator for tracking said pseudorandom modulation;

an output coupled to said correlator to provide pulse position data for said received optical pulse, wherein said data comprises packet data, a packet of said data including a header with data for identifying one or both of a pseudorandom sequence identifier and a pseudorandom sequence seed; and a system coupled to said pseudorandom sequence generator for reading said packet header to determine data for initialising said pseudorandom sequence generator.

18. An optical data communications receiver for receiving data encoded using optical pulse position, the receiver comprising:

an optical signal reception device;

a reference signal memory for storing a reference channel response signal;

a correlator coupled to said reference signal memory and to said optical signal reception device for correlating a received optical pulse with said stored reference channel response signal to determine said optical pulse position; and a receiver front end including:

said optical signal reception device;

an analogue-to-digital (A/D) converter coupled between an output of said optical signal reception device and said correlator; and a received signal level adjuster to adjust an input signal to said analogue-to-digital converter, wherein said received signal level adjuster is responsive to said reference channel response signal; and an output coupled to said correlator to provide pulse position data for said received optical pulse.

* * * * *